United States Patent
Didyk et al.

(10) Patent No.: US 9,756,316 B2
(45) Date of Patent: Sep. 5, 2017

(54) JOINT VIEW EXPANSION AND FILTERING FOR AUTOMULTISCOPIC 3D DISPLAYS

(71) Applicant: Massachusetts Institute of Technology, Cambridge, MA (US)

(72) Inventors: Piotr Krzysztof Didyk, Swiebodzice (PL); Pitchaya Sitthi-Amorn, Cambridge, MA (US); Wojciech Matusik, Lexington, MA (US); Frederic Durand, Somerville, MA (US); William T. Freeman, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 334 days.

(21) Appl. No.: 14/531,548

(22) Filed: Nov. 3, 2014

(65) Prior Publication Data

US 2015/0124062 A1 May 7, 2015

Related U.S. Application Data

(60) Provisional application No. 61/899,595, filed on Nov. 4, 2013.

(51) Int. Cl.
*H04N 13/04* (2006.01)
*H04N 13/00* (2006.01)

(52) U.S. Cl.
CPC ..... *H04N 13/0402* (2013.01); *H04N 13/0011* (2013.01); *H04N 13/0018* (2013.01); *H04N 13/0022* (2013.01); *H04N 13/0447* (2013.01)

(58) Field of Classification Search
None
See application file for complete search history.

(56) References Cited

U.S. PATENT DOCUMENTS

| 725,567 A | 4/1903 | Ives |
|---|---|---|
| 6,097,394 A | 8/2000 | Levoy et al. |

(Continued)

FOREIGN PATENT DOCUMENTS

| EP | 1 235 439 A2 | 8/2002 |
| EP | 2 323 416 A2 | 5/2011 |
| WO | WO 2015/120032 A1 | 8/2015 |

OTHER PUBLICATIONS

"Applicants' Video," Nov. 5, 2013, retrieved from the Internet URL: http://people.csail.mit.edu/pdidyk/projects/MultiviewConversion/MultiviewConversion.mp4, and also available at http://www.youtube.com/ under the title "Joint View Expansion and Filtering for Automultiscopic 3D Displays."

(Continued)

*Primary Examiner* — Jorge L Ortiz Criado
*Assistant Examiner* — Stefan Gadomski
(74) *Attorney, Agent, or Firm* — Hamilton, Brook, Smith & Reynolds, P.C.

(57) ABSTRACT

Multi-view autostereoscopic displays provide an immersive, glasses-free 3D viewing experience, but they preferably use correctly filtered content from multiple viewpoints. The filtered content, however, may not be easily obtained with current stereoscopic production pipelines. The proposed method and system takes a stereoscopic video as an input and converts it to multi-view and filtered video streams that may be used to drive multi-view autostereoscopic displays. The method combines a phase-based video magnification and an interperspective antialiasing into a single filtering process. The whole algorithm is simple and may be efficiently implemented on current GPUs to yield real-time performance. Furthermore, the ability to retarget disparity is naturally supported. The method is robust and works transparent materials, and specularities. The method provides superior results when compared to the state-of-the-art depth- (Continued)

based rendering methods. The method is showcased in the context of a real-time 3D videoconferencing system.

24 Claims, 15 Drawing Sheets
(13 of 15 Drawing Sheet(s) Filed in Color)

(56) References Cited

U.S. PATENT DOCUMENTS

| | | | |
|---|---|---|---|
| 7,839,549 B2* | 11/2010 | Mihajlovic | G02B 27/2214 359/15 |
| 8,624,964 B2* | 1/2014 | Barenbrug | H04N 13/0018 348/42 |
| 9,113,043 B1* | 8/2015 | Kim | H04N 13/02 |
| 9,412,172 B2 | 8/2016 | Sorkine-Hornung | |
| 9,497,380 B1 | 11/2016 | Jannard et al. | |
| 2004/0233275 A1 | 11/2004 | Tomita | |
| 2006/0290777 A1* | 12/2006 | Iwamoto | G03H 1/2294 348/49 |
| 2007/0229653 A1* | 10/2007 | Matusik | H04N 13/0018 348/51 |
| 2008/0043095 A1 | 2/2008 | Vetro et al. | |
| 2008/0252638 A1* | 10/2008 | Riemens | H04N 13/0003 345/419 |
| 2008/0291268 A1* | 11/2008 | Berretty | H04N 13/0011 348/51 |
| 2009/0262181 A1* | 10/2009 | Rotem | H04N 13/004 348/46 |
| 2010/0134599 A1* | 6/2010 | Billert | H04N 13/0025 348/48 |
| 2010/0302235 A1* | 12/2010 | Darshan | G06T 5/50 345/419 |
| 2011/0032587 A1* | 2/2011 | Bjelkhagen | G02B 5/32 359/23 |
| 2011/0102423 A1* | 5/2011 | Nam | H04N 13/0404 345/419 |
| 2011/0109629 A1 | 5/2011 | Ericson et al. | |
| 2011/0304708 A1* | 12/2011 | Ignatov | H04N 13/0022 348/51 |
| 2012/0013651 A1* | 1/2012 | Trayner | G02B 5/32 345/690 |
| 2012/0176473 A1 | 7/2012 | Genova et al. | |
| 2013/0002816 A1* | 1/2013 | Hannuksela | G06T 9/00 348/43 |
| 2013/0278727 A1 | 10/2013 | Tamir et al. | |
| 2013/0286170 A1 | 10/2013 | Qin et al. | |
| 2014/0072228 A1* | 3/2014 | Rubinstein | G06T 7/207 382/197 |
| 2014/0072229 A1* | 3/2014 | Wadhwa | G06K 9/481 382/197 |
| 2014/0285623 A1* | 9/2014 | Bruls | G06T 5/002 348/43 |
| 2015/0042770 A1* | 2/2015 | Barenbrug | H04N 13/0447 348/51 |
| 2015/0071360 A1* | 3/2015 | Nguyen | H04N 19/597 375/240.18 |
| 2015/0156470 A1 | 6/2015 | Didyk et al. | |
| 2015/0319423 A1 | 11/2015 | Kim et al. | |

OTHER PUBLICATIONS

Didyk, P., Sitthi-Amorn, P., Freeman, W. T., Durand, F., and Matusik, W., "Joint View Expansion and Filtering for Automultiscopic 3D Displays," *ACM Trans. Graph.*, 32, 6, Nov. 2013, Article No. 221.

Akeley, K., Watt, S. J., Girshick, A. R., and Banks, M. S., "A Stereo Display Prototype with Multiple Focal Distances," *ACM Trans. Graph.*, 23, 3, Aug. 2004, p. 804-813.

Balogh, T., "The HoloVizio System," in *Electronic Imaging*, Jan. 2006, p. 60550U-1-60550U-12.

Brown, M. Z., Burschka, D., and Hager, G. D., "Advances in Computational Stereo," *IEEE Transactions on Pattern Analysis and Machine Intelligence*, 25, 8, Aug. 2003, p. 993-1008.

Chai, J. X., Tong, X., Chan, S. C., and Shum, H. Y., "Plenoptic Sampling," in *Proceedings of the 27th annual conference on Computer graphics and interactive techniques*, ACM Press/Addison-Wesley Publishing Co., Jul. 2000, p. 307-318.

Didyk, P., Ritschel, T., Eisemann, E., Myszkowski, K., and Seidel, H.-P., "Adaptive Image-space Stereo View Synthesis," in *Proc. VMV*, Nov. 2010, 8 pages.

Didyk, P., Ritschel, T., Eisemann, E., Myszkowski, K., Seidel, H.-P., and Matusik, W., "A Luminance-Contrast-Aware Disparity Model and Applications," *ACM Trans. Graph.* (*Proc. SIGGRAPH Asia*), 31, 6, Nov. 2012, p. 184:1-184:10.

Farre, M., Wang, O., Lang, M., Stefanoski, N., Hornung, A., and Smolic, A., "Automatic Content Creation for Multiview Autostereoscopic Displays Using Image Domain Warping," in *IEEE International Conference on Multimedia and Expo*, Jul. 2011, 6 pages.

Holliman, N. S., Dodgson, N. A., Favalora, G. E., and Pockett, L., "Three-Dimensional Displays: A Review and Applications Analysis," *IEEE Transactions on Broadcasting*, 57, 2, Jun. 2011, p. 362-371.

Hosni, A., Rhemann, C., Bleyer, M., Rother, C., and Gelautz, M., "Fast Cost-Volume Filtering for Visual Correspondence and Beyond," *IEEE Transactions on Pattern Analysis and Machine Intelligence*, 35, 2, Feb. 2013, p. 504-511.

Isaksen, A., McMillan, L., and Gortler, S. J., "Dynamically Reparameterized Light Fields," in *Proceedings of the $27^{th}$ Annual Conference on Computer Graphics and Interactive Techniques*, ACM Press/Addison-Wesley Publishing Co., Jul. 2000, p. 297-306.

Lambooij, M., Ijsselsteijn, W., Fortuin, M., and Heynderickx, I., "Visual Discomfort and Visual Fatigue of Stereoscopic Displays: A Review," *Journal of Imaging Science and Technology*, 53, May 2009, p. 030201-14.

Lang, M., Hornung, A., Wang, O., Poulakos, S., Smolic, A., and Gross, M., "Nonlinear Disparity Mapping for Stereoscopic 3D," *ACM Trans. Graph.*, 29, 4, Jul. 2010, p. 75:1-75:10.

Levoy, M., and Hanrahan, P., "Light Field Rendering," in *Proceedings of the 23rd Annual Conference on Computer Graphics and Interactive Techniques*, ACM, Aug. 1996, p. 31-42.

Lipton, L., and Feldman, M. H., "New autostereoscopic display technology: The SynthaGram," in *Electronic Imaging*, International Society for Optics and Photonics, Jan. 2002, p. 229-235.

Liu, C., Torralba, A., Freeman, W. T., Durand, F., and Adelson, E. H., "Motion Magnification," *ACM Trans. Graph.*, 24, 3, Jul. 2005, 519-526.

Matusik, W., and Pfister, H., "3D TV: A Scalable System for Real-Time Acquisition, Transmission, and Autostereoscopic Display of Dynamic Scenes," *ACM Trans. Graph.*, 23, 3, Aug. 2004, p. 814-824.

Richardt, C., Stoll, C., Dodgson, N.A., Seidel, H.-P., and Theobalt, C., "Coherent Spatiotemporal Filtering, Upsampling and Rendering of RGBZ Videos," *Computer Graphics Forum* (*Proc. Eurographics*), 31, 2, May 2012, p. 247-256.

Schmidt, A., and Grasnick, A., "Multi-viewpoint Autostereoscopic Displays from 4D-Vision," in *Electronic Imaging*, May 2002 p. 212-221.

Simoncelli, E. P., and Freeman, W. T., "The Steerable Pyramid: A Flexible Architecture for Multi-Scale Derivative Computation," in *IEEE International Conference on Image Processing*, vol. 3, Oct. 1995, p. 444-447.

Simoncelli, E. P., Freeman, W. T., Adelson, E. H., and Heeger, D. J., "Shiftable Multiscale Transforms," *IEEE Transactions on Information Theory*, 38, 2, Mar. 1992, p. 587-607.

Smolic, A., Muller, K., Dix, K., Merkle, P., Kauff, P., and Wiegand, T., "Intermediate View Interpolation Based on Multiview Video Plus Depth for Advanced 3D Video Systems," in *IEEE International Conference on Image Processing*, Oct. 2008, p. 2448-2451.

Stewart, J., Yu, J., Gortler, S. J., and McMillan, L., "A New Reconstruction Filter for Undersampled Light Fields," in *Proceedings of the 14th Eurographics workshop on Rendering*, Eurographics Association, Jun. 2003, p. 150-156.

(56) References Cited

OTHER PUBLICATIONS

Takaki, Y., and Nago, N., "Multi-projection of lenticular displays to construct a 256-view super multi-view display," *Optics Express*, 18, 9, Apr. 2010, p. 8824-8835.

Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, p. 80:1-80:9.

Wang, Z., Bovik, A. C., Sheikh, H. R., and Simoncelli, E. P., "Image Quality Assessment: From Error Visibility to Structural Similarity," *IEEE Transactions on Image Processing*, 13, 4, Apr. 2004, p. 600-612.

Wetzstein, G., Lanman, D., Hirsch, M., and Raskar, R., "Tensor Displays: Compressive Light Field Synthesis using Multilayer Displays with Directional Backlighting," *ACM Trans. Graph. (Proc. SIGGRAPH)*, 31, 4, Jul. 2012, p. 80:1-80:11.

Wilburn, B. S., Smulski, M., Lee, H. H. K., and Horowitz, M. A., "Light Field Video Camera," in *Electronic Imaging*, International Society for Optics and Photonics, Dec. 2001, p. 29-36.

Wu, H. Y., Rubinstein, M., Shih, E., Guttag, J., Durand, F., and Freeman, W. T., "Eulerian Video Magnification for Revealing Subtle Changes in the World," *ACM Trans. Graph. (Proc. SIGGRAPH)* 31, 4, Jul. 2012, p. 65:1-65:8.

Zwicker, M., Matusik, W., Durand, F., and Pfister, H., "Antialiasing for Automultiscopic 3D Displays," in *Proceedings of the 17th Eurographics conference on Rendering Techniques*, Eurographics Association, Jun. 2006, p. 73-82.

"The Stanford Light Field Archive," [online] Jun. 2008. Retrieved from the Internet URL: http://lightfield.stanford.edu/lfs.html.

International Preliminary Report on Patentability of PCT/US2015/014434, "Reducing View Transitions Artifacts in Automultiscopic Displays," date issued, Aug. 9, 2016.

U.S. Appl. No. 14/613,924, Didyk et al.

Agarwala, A., Zheng, K. C., Pal, C., Agrawala, M., Cohen, M., Curless, B., Salesin, D., and Szeliski, R., "Panoramic Video Textures," in *ACM Trans. Graph.*, (TOG), 24, 821-827, downloaded from http://grail.cs.washington.edu/projects/panovidtex/panovidtex.pdf, available as of May 2005.

Agarwala, A., "Efficient Gradient-Domain Compositing Using Quadtrees," in *ACM Trans. Graph*, (TOG), 26, Article No. 94, downloaded from http://www.agarwala.org/efficient_gdc/preprint.pdf, available as of May 2007.

Birklbauer, C., and Bimber, O., "Light-Field Retargeting," Wiley Online Library, *Computer Graphics Forum*, 31, 295-303, May 2012.

Chen, B., Ofek, E., Shum, H.-Y., and Levoy, M., "Interactive Deformation of Light Fields," in *ACM Proceedings of the 2005, Symposium on Interactive 3D Graphics and Games (I3D) 2005 conference proceedings*, 367, 139-146, downloaded from https://graphics.stanford.edu/papers/interactive_deformation_lfs/interactive_deformation.pdf, available as of Mar. 2005.

Eisemann, M., Gohlke, D., and Magnor, M., "Edge-Constrained Image Compositing," *Proceedings of Graphics Interface 2011, Canadian Human-Computer Communications Society*, 191-198, May 2011.

Filippini, H. R., and Banks, M. S., "Limits of stereopsis explained by local cross-correlation," *Journal of Vision* 9(1), 8, 1-18, Jan. 2009.

Hirsch, M., Wetzstein, G., and Raskar, R., "A Compressive Light Field Projection System," in *ACM Trans. Graph.* 33, 4, 1-12, downloaded from http://web.media.mit.edu/~gordonw/CompressiveLightFieldProjector/CompressiveLightFieldProjector.pdf, available as of May 2014.

Horn, D. R., and Chen, B., "Lightshop: Interactive Light Field Manipulation and Rendering," in *ACM Proceedings of the 200 Symposium on Interactive 3D Graphics and Games*, 121-383 128, downloaded from http://graphics.stanford.edu/papers/lightshop/lightshop.pdf, available as of Mar. 2007.

Jia, J., and Tang, C.-K., "Image Stitching Using Structure Deformation," *IEEE Transactions on Pattern Analysis and Machine Intelligence*, 30, 4, 617-631, Apr. 2008.

Jia, J., Sun, J., Tang, C.-K., and Shum, H.-Y., "Drag-and-Drop Pasting," *ACM Transactions on Graphics* (TOG), 25, 631-636, Jul. 2006.

Kim, C., Hornung, A., Heinzle, S., Matusik, W., and Gross, M., "Multi-Perspective Stereoscopy from Light Fields," *ACM Trans. Graph.* 30, 6, 190, Dec. 2011.

Kim, C., Zimmer, H., Pritch, Y., Sorkine-Hornung, A., and Gross, M., "Scene Reconstruction from High Spatio-Angular Resolution Light Fields," *ACM Trans. Graph. (TOG)*, 32, 4, Article No. 73, Jul. 2013.

Konrad, J., and Agniel, P., "Subsampling Models and Anti-Alias Filters for 3-D Automultiscopic Displays," *IEEE Transactions on Image Processing*, 15, 1, 128-140, Jan. 2006.

Kwatra, V., Schödl, A., Essa, I., Turk, G., and Bobick, A., "Graphcut Textures: Image and Video Synthesis Using Graph Cuts," *ACM Trans. Graph.* 22, 3, 277-286, Mar. 2002.

Levin, A., Zomet, A., Peleg, S., and Weiss, Y., "Seamless Image Stitching in the Gradient Domain," *Computer Vision-ECCV*, 3024, 377-389, May 2004.

Lippmann, G., "Épreuves Réversibles Donnant La Sensation Du Relief," *Journal of Physics* 7, 4, 821-825, Nov. 1908.

Mahajan, D., Huang, F.-C., Matusik, W., Ramamoorthi, R., and Belhumeur, P., "Moving Gradients: A Path-Based Method for Plausible Image Interpolation," *ACM Trans. Graph.* 28, 3, 42, Aug. 2009.

Masia, B., Wetzstein, G., Aliaga, C., Raskar, R., and Gutierrez, D., "Display Adaptive 3D Content Remapping," *Computers & Graphics* 37, 8, 983-996, Jul. 2013.

Pérez, P., Gangnet, M., and Blake, A., "Poisson Image Editing," *ACM Trans. Graph.* 22, 3, 313-318, Jul. 2003.

Peterka, T., Kooima, R. L., Sandin, D. J., Johnson, A. E., Leigh, J., and Defanti, T. A., "Advances in the Dynallax Solid-State Dynamic Parallax Barrier Autostereoscopic Visualization Display System," *IEEE Transactions on Visualization and Computer Graphics* 14, 487-499, May-Jun. 2008.

Rubinstein, M., Shamir, A., and Avidan, S., "Improved Seam Carving for Video Retargeting," *ACM Trans. Graph.* 27, 3, 16:1-16:9, Aug. 2008.

Schödl, A., Szeliski, R., Salesin, D. H., and Essa, I., "Video Textures," *Annual Conference on Computer Graphics, SIGGRAPH '00*, 489-498, Jul. 2000.

Shibata, T., Kim J., Hoffman, D., and Banks, M., "The Zone of Comfort: Predicting Visual Discomfort with Stereo Displays," *Journal of Vision* 11, 8, 11:1-11:29, Jul. 2011.

Tompkin, J., Heinzle, S. Kautz, J., and Matusik, W., "Content-Adaptive Lenticular Prints," *ACM Trans. Graph.* 32, 4, 133:1-133:10, Jul. 2013.

Ye, G., State, A., and Fuchs, H., "A Practical Multiviewer Tabletop Autostereoscopic Display," *2010 9th IEEE International Symposium on Mixed and Augmented Reality (ISMAR)*, 147-156, Oct. 2010.

Yi, S.-Y., Chae and, H.-B., and Lee, S.-H., "Moving Parallax Barrier Design for Eye-Tracking Autostereoscopic Displays," *3DTV Conference: The True Vision—Capture, Transmission and Display of 3D Video*, May 2008.

Zhang, Z., Wang, L., Guo, B., and Shum, H.-Y., "Feature-Based Light Field Morphing," *ACM Trans. Graph.* 21, 3, 457-464, Jul. 2002.

Du, Song-Pei, Didyk, Piotr, Durand, Frédo, Hu, Shi-Min, and Matusik, Wojciech, "Improving Visual Quality of View Transitions in Automultiscopic Displays," *ACM Trans. Graph. (Proc. SIGGRAPH Asia)*, 33, 6, Article 192, Sep. 2014.

Brookes, A., and Stevens, K. A., "The Analogy Between Stereo Depth and Brightness," *Perception* 18, 5, 601-614, Feb. 1989.

"Applicants' Supplementary Video," retrieved from the Internet URL: http://people.csail.mit.edu/pdidyk/projects/MultiviewTransitions/MultiviewTransitions.avi, and also available at http://www.youtube.com/ under the title, "Improving Visual Quality of View Transitions in Automultiscopic Displays," Sep. 2014.

MERL, UCSD/MERL "Light Field Repository" downloaded from https://web.archive.org/web/20070630144440/http://graphics.ucsd.edu/datasets/lfarchive, available as of Jun. 2007.

(56) References Cited

OTHER PUBLICATIONS

Notification of Transmittal of The International Search Report and The Written Opinion of the International Searching Authority, PCT/US2015/014434, "Reducing View Transitions Artifacts in Automultiscopic Displays," date mailed, Apr. 28, 2015.

\* cited by examiner

JOINT VIEW EXPANSION AND FILTERING FOR AUTOMULTISCOPIC 3D DISPLAYS

RELATED APPLICATION

This application claims the benefit of U.S. Provisional Application No. 61/899,595, filed on Nov. 4, 2013. The entire teachings of the above application are incorporated herein by reference.

GOVERNMENT SUPPORT

This invention was made with Government support under Grant Nos. IIS-1116296 and IIS-1111415 awarded by the National Science Foundation. The Government has certain rights in the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Stereoscopic three-dimensional (3D) content is becoming more popular as it reaches an increasing number of home users. While most of current television (TV) sets are 3D-enabled, and there are plenty of 3D movies and sports programming available, the adoption of stereoscopic 3D is hampered by the use of 3D glasses that are preferably used for a given user to view the content. Multi-view autostereoscopic (or automultiscopic) displays offer a superior visual experience, since they provide both binocular and motion parallax without the use of special glasses. Using an automultiscopic display, a viewer is not restricted to being in a particular position and many viewers may watch the display at the same time. Furthermore, automultiscopic displays may be manufactured inexpensively, for non-limiting example, by adding a parallax barrier or a lenticular screen to a standard display.

SUMMARY OF THE INVENTION

Existing approaches have at least three major problems that the present invention addresses in its solution for multi-view autostereoscopic TV. First, existing 3D content production pipelines provide two views, while multi-view stereoscopic displays preferably use images from many viewpoints. In existing approaches, capturing TV-quality scenes with dense camera rigs may be impractical because of the size and cost of professional quality cameras. A solution to use view-interpolation to generate these additional views preferably uses an accurate depth and inpainting of missing scene regions. Despite progress in stereo depth reconstruction algorithms, the quality of existing approaches is not good enough for TV broadcast and movies. Handling scenes that include defocus blur, motion blur, transparent materials, and specularities is especially challenging in existing approaches.

Second, multi-view autostereoscopic displays preferably use special filtering to remove interperspective aliasing, e.g., image content that is not supported by a given display. See for example, the following publication that is hereby incorporated by reference: Zwicker, M., Matusik, W., Durand, F., and Pfister, H., "Antialiasing for Automultiscopic 3D Displays," in *Proceedings of the 17th Eurographics conference on Rendering Techniques*, Eurographics Association, June 2006, pg. 73-82. Without performing filtering, severe ghosting and flickering may be visible. However, in order to properly antialias a multi-view video, a dense light field is preferably used.

Third, to assure viewing comfort, image disparities preferably are modified according to the display type, size, and viewer preference. This disparity retargeting step also preferably rerenders the scene with adjusted disparities.

Applicants' proposed approach includes a method, system, and apparatus that addresses the foregoing limitations of the art. Applicants' proposed approach takes a stereoscopic stream as an input and produces a correctly filtered multi-view video for a given automultiscopic display, as shown in FIG. 1A. In at least one embodiment, the proposed approach does not require changes to existing (current) stereoscopic production and content delivery pipelines. Additional processing may be performed by the client (e.g., at home). Some advantages of the proposed approach are that it is simple and it may be implemented in hardware. In one embodiment, the proposed approach is implemented on a GPU (Graphics Processing Unit) in a CUDA (Compute Unified Device Architecture) which achieves a near real-time performance.

Some key features of the proposed approach are a steerable pyramid decomposition and filtering that are successfully used for motion magnification in video sequences (see the following publications that at least further describe steerable pyramids, filtering, and pyramid decomposition, and are hereby incorporated by reference: Wadhwa, N., Rubinstein, M., Guttag, J., Durand, F., and Freeman, W. T., "Phase-Based Video Motion Processing," *ACM Trans. Graph.* (*Proc. SIGGRAPH*), 32, 4, July 2013, pg. 80:1-80:9, U.S. patent application Ser. No. 13/607,173, filed on Sep. 7, 2012, now U.S. Patent Publication No. 2014/0072228, published on Mar. 13, 2014, and U.S. patent application Ser. No. 13/707,451, filed on Dec. 6, 2012, now U.S. Patent Publication No. 2014/0072229, published on Mar. 13, 2014).

In at least one embodiment, Applicants' proposed approach shows how similar concepts may be used for view interpolation and how the antialiasing filter and disparity remapping may be incorporated without requiring additional cost. In the Figures that follow, at least in FIGS. 4A-4D and FIGS. 5-10, results of Applicants' proposed approach are demonstrated on a variety of different scenes including defocus blur, motion blur, and complex appearance, and Applicants' proposed approach is compared to both the ground truth and depth-based rendering approaches. In addition, Applicants demonstrate the proposed approach on a real-time 3D video conferencing system that preferably uses two video cameras and provides a multi-view autostereoscopic experience.

The contributions of the proposed approach include, but are not limited to, an efficient algorithm for joint view expansion, filtering and disparity remapping for multi-view autostereoscopic displays. Applicants also provide herein an evaluation of the proposed approach on a variety of different scenes, along with a comparison to both the ground truth and the state-off-the-art depth-based rendering techniques.

The proposed approach includes a system and corresponding method that remedies the deficiencies of the existing approaches. The proposed approach is directed to a computer system and a corresponding method for rendering a three-dimensional (3D) video display. An embodiment includes a computer-implemented method that uses at least one processor and at least one associated memory. Embodiments may receive a video stream formed of a sequence of frames. Each frame may have image content corresponding to a plurality of views, and the views may be initial views. The proposed approach may apply one or more spatial band pass filters to the received image content resulting in filtered images. Each spatial band pass filter may have a respective spatial frequency band. From the filtered images, embodiments compute one or more output images that synthesize additional views with respect to the initial views. The output images may be computed from the filtered images of a given spatial band pass filter corresponding to different visual disparities for the respective spatial frequency band of that given band pass filter. The computing of output images may enable the option to include removing inter-view (inter-perspective) aliasing by filtering the output images according to local depth using phase shift instead of recovering depth information. Embodiments drive a display with the computed and optionally anti-aliased filtered output images, rendering a multi-view autostereoscopic 3D video display.

In another embodiment of the computer-implemented method, the received video stream may be a 3D stereo video stream of images having two views (left and right) per frame. In yet another embodiment, the step of applying one or more spatial band pass filters may include applying a one-dimensional (1D) filter. In a further embodiment, the step of applying spatial band pass filters may include applying a two-dimensional (2D) filter. In another embodiment, the step of computing the output images may be performed in a manner that results in a stereo disparity expansion of views without need of a dense depth map reconstruction.

In another embodiment of the computer-implemented method, the disparity range in the output images is user adjustable by any of: (i) adjusting a magnification factor in the given spatial band pass filter, and (ii) at least one of defining and translating a disparity mapping function to map a certain phase shift at the spatial frequency of the given spatial band pass filter to a new phase shift. In yet another embodiment, the step of computing may include interpolating in-between views.

In a further embodiment of the computer-implemented method, the step of applying spatial band pass filters may capture correspondence between views using phase differences for multiple spatial frequencies and orientations separately. In the step of computing, local depth may be represented as a plurality of values instead of as a single value. In another embodiment, the step of driving the display may be in real-time relative to the step of receiving the video stream.

Another embodiment of the computer-implemented method may include prealigning the initial views with each other before applying the spatial band pass filters. A further embodiment may include optional antialiasing for adding depth-of-field effect. In another embodiment, the plurality of views may include a relatively low number of views.

An embodiment of a computer-implemented system for rendering a three-dimensional (3D) video display may include a receiving module configured to receive a video stream formed of a sequence of frames. Each frame may have image content corresponding to a plurality of views, the views being initial views. The system may also include a computing module that is responsive to the receiving module and is configured to apply one or more spatial band pass filters to the received image content resulting in filtered images. Each spatial band pass filter may have a respective spatial frequency band. The computing module may be further configured to compute, from the filtered images, one or more output images that synthesize additional views with respect to the initial views. The output images may be computed from the filtered images of a given spatial band pass filter corresponding to different visual disparities for the respective spatial frequency band of that given band pass filter. The computing module may be further configured to enable optionally including removing inter-view (inter-perspective) aliasing by filtering the output images according to local depth using phase shift instead of recovering depth information. The system may also include a display module coupled to receive the output images from the computing module. The display module is configured to drive a display with the computed and optionally anti-aliased filtered output images, rendering a multi-view autostereoscopic 3D video display.

In another embodiment, the computer-implemented system may be a real-time 3D video conferencing system. In yet another embodiment of the computer-implemented system, the received video stream may be a 3D stereo video stream of images having two views (left and right) per frame. In a further embodiment, the computing module may be further configured to apply at least one one-dimensional (1D) filter corresponding to at least one of the one or more spatial band pass filters. In another embodiment, the computing module may be further configured to apply at least one two-dimensional (2D) filter corresponding to at least one of the one or more spatial band pass filters. In yet another embodiment, the computing module may be further configured to compute the output images in a manner that results in a stereo disparity expansion of views without need of a dense depth map reconstruction.

In yet another embodiment of the computer-implemented system, the display module may be further configured to enable a user to adjust disparity range in the output images by any of: (i) adjusting a magnification factor in the given spatial band pass filter, and (ii) at least one of defining and translating a disparity mapping function to map a certain phase shift at the spatial frequency of the given spatial band pass filter to a new phase shift. In another embodiment of the computer-implemented system, the computing module may be further configured to interpolate in-between views. In a further embodiment, the computing module may be further configured to apply spatial band pass filters including capturing correspondence between views using phase differences for multiple spatial frequencies and orientations separately. The computing module may be further configured to compute local depth, including representing local depth as a plurality of values instead of as a single value.

In a further embodiment of the computer-implemented system, the display module may be further configured to drive the display and the computing module may be further configured to receive the video stream in real-time. In another embodiment, the computing module may be configured to prealign the initial views with each other before the computing module is configured to apply the one or more spatial band pass filters. In another embodiment, the optional antialiasing may be used for adding depth-of-field effect. In a further embodiment, the plurality of views may include a relatively low number of views.

An alternative embodiment is directed to a non-transitory computer readable medium having stored thereon a sequence of instructions which, when loaded and executed by a processor coupled to an apparatus, causes the apparatus to: receive a video stream formed of a sequence of frames, each frame having image content corresponding to a plurality of views, the views being initial views; apply one or more spatial band pass filters to the received image content resulting in filtered images, each spatial band pass filter having a respective spatial frequency band; compute, from the filtered images, one or more output images that synthesize additional views with respect to the initial views, the output images computed from the filtered images of a given spatial band pass filter corresponding to different visual disparities for the respective spatial frequency band of that given band pass filter; enable optionally including removing inter-view (inter-perspective) aliasing by filtering the output images according to local depth using phase shift instead of recovering depth information; and drive a display with the computed and optionally anti-aliased filtered output images, rendering a multi-view autostereoscopic 3D video display.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
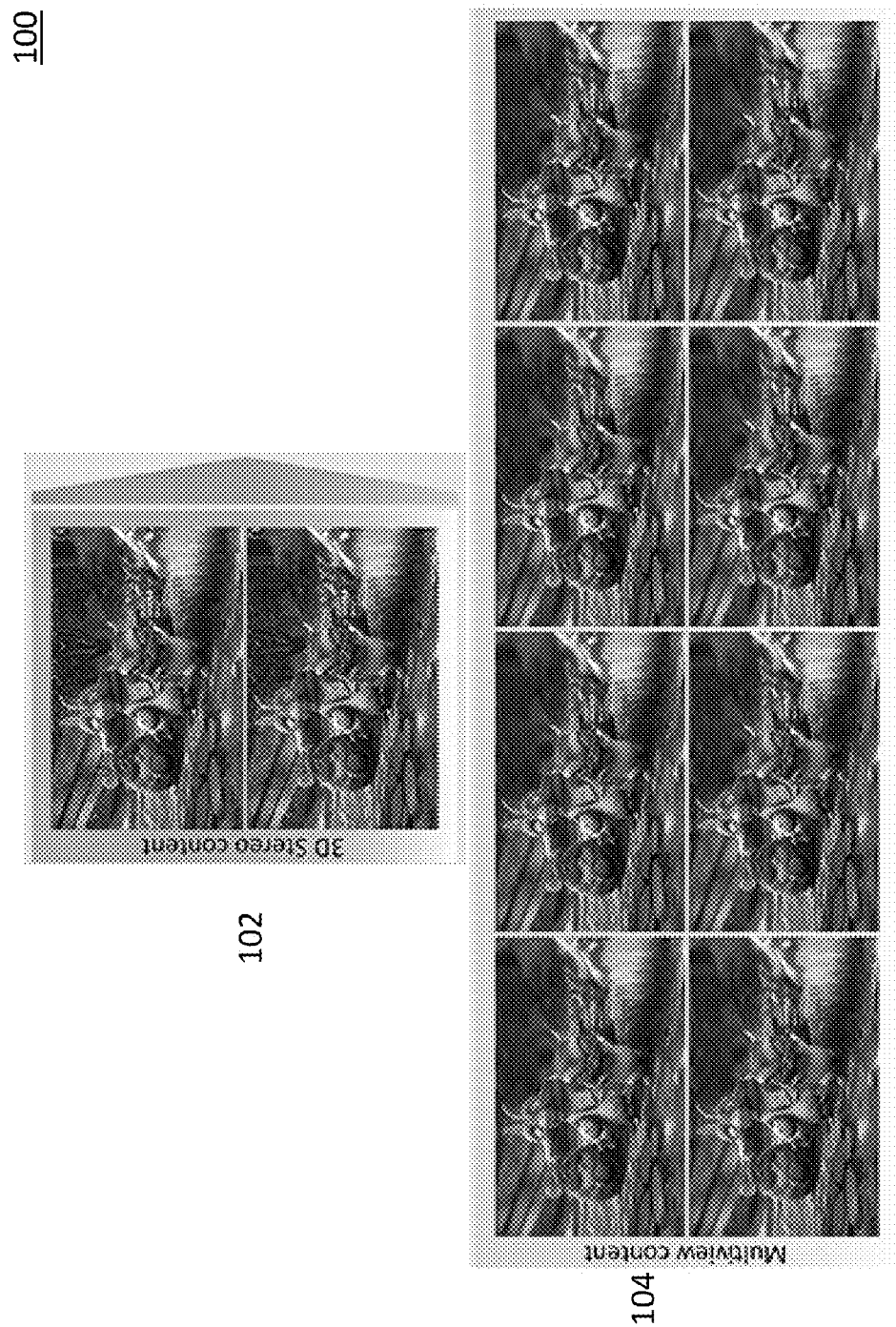
FIG. 1A illustrates the present invention method and system presented by Applicants that takes a stream of stereo images as an input, synthesizes additional views that are preferably used for an automultiscopic display, and performs filtering. ("Big Buck Bunny" © by Blender Foundation).

A description of example embodiments of the invention follows.

The teachings of all patents, published applications and references cited herein are incorporated by reference in their entirety.

An automultiscopic display may reproduce multiple views corresponding to different viewing angles, thereby allowing for a glasses-free 3D and more immersive viewing experience for a user. In order to achieve multiple images from different locations, the views are preferably provided to the display. One standard technique to acquire multiple images from different locations is to use a camera array. Such camera array systems may include calibrated and synchronized sensors, which may record a scene from different locations. The number of cameras may range from a dozen (see for example, the following publication: Matusik, W., and Pfister, H., "3D TV: A Scalable System for Real-Time Acquisition, Transmission, and Autostereoscopic Display of Dynamic Scenes," *ACM Trans. Graph.*, 23, 3, August 2004, pg. 814-824) to over a hundred (also see for example, the following publication: Wilburn, B. S., Smulski, M., Lee, H. H. K., and Horowitz, M. A., "Light Field Video Camera," in *Electronic Imaging*, International Society for Optics and Photonics, July 2002, pg. 29-36). However, such camera setups may be impractical (see for example, the following publication: Farre, M., Wang, O., Lang, M., Stefanoski, N., Hornung, A., and Smolic, A., "Automatic Content Creation for Multiview Autostereoscopic Displays Using Image Domain Warping," in *IEEE International Conference on Multimedia and Expo*, July 2011, 6 pages) and too expensive for commercial use. Instead, it is possible to use image-based techniques to generate missing views. Most camera setup techniques preferably recover depth information first, and then use a view synthesis method for computing additional views (see for example, the following publication: Smolic, A., Muller, K., Dix, K., Merkle, P., Kauff, P., and Wiegand, T., "Intermediate View Interpolation Based on Multiview Video Plus Depth for Advanced 3D Video Systems," in *IEEE International Conference on Image Processing*, October 2008, pg. 2448-2451). Although there are a number of techniques that try to recover depth information from stereo views (see for example, the following publication: Brown, M. Z., Burschka, D., and Hager, G. D., "Advances in Computational Stereo," *IEEE Transactions on Pattern Analysis and Machine Intelligence*, 25, 8, August 2003, pg. 993-1008), recovering depth information from stereo views is an ill-posed problem. Most existing methods are prone to artifacts and temporal inconsistency. The quality of estimated depth maps may be improved in a post-processing step (see for example, the following publication: Richardt, C., Stoll, C., Dodgson, N. A., Seidel, H.-P., and Theobalt, C., "Coherent Spatiotemporal Filtering, Upsampling and Rendering of RGBZ Videos," *Computer Graphics Forum (Proc. Eurographics)*, 31, 2, May 2012, pg. 247-256). However, post-processing may be a time consuming process. Instead of recovering dense map correspondence, sparse depth maps may be recovered and a warping technique used to compute new views (see Farre, M., Wang, O., Lang, M., Stefanoski, N., Hornung, A., and Smolic, A., "Automatic Content Creation for Multiview Autostereoscopic Displays Using Image Domain Warping," in *IEEE International Conference on Multimedia and Expo*, July 2011, 6 pages). Such recovery methods may produce good results but at an expense of computational time which prevents real-time solutions.

Significant developments in display designs exist (see for example, the following publication: Holliman, N. S., Dodgson, N. A., Favalora, G. E., and Pockett, L., "Three-Dimensional Displays: A Review and Applications Analysis," *IEEE Transactions on Broadcasting*, 57, 2, June 2011, pg. 362-371). Commercial automultiscopic displays are often based on parallax barriers and/or lenticular sheets. Both parallax barriers and lenticular sheets, placed atop a high resolution panel, trade spatial resolution for angular resolution, and produce multiple images encoded as one image on the panel (see for example, the following publications: Lipton, L., and Feldman, M. H., "New autostereoscopic display technology: The SynthaGram," in *Electronic Imaging*, International Society for Optics and Photonics, January 2002, pg. 229-235; and Schmidt, A., and Grasnick, A., "Multi-viewpoint Autostereoscopic Displays from 4D-Vision," in *Electronic Imaging*, May 2002 pg. 212-221). Multi-view projector systems also exist (Matusik, W., and Pfister, H., "3D TV: A Scalable System for Real-Time Acquisition, Transmission, and Autostereoscopic Display of Dynamic Scenes," *ACM Trans. Graph.*, 23, 3, August 2004, pg. 814-824; and Balogh, T., "The HoloVizio System," in *Electronic Imaging*, January 2006, pg. 60550U-1-60550U-12). An attempt of building a display which reproduces the entire light field includes a display with 256 views, proposed by Takaki, Y., and Nago, N., "Multi-projection of lenticular displays to construct a 256-view super multi-view display," *Optics Express*, 18, 9, April 2010, pg. 8824-8835. Also compressive and multi-layer displays introduce more sophisticated hardware solutions (see for example, the following publications: Akeley, K., Watt, S. J., Girshick, A. R., and Banks, M. S., "A Stereo Display Prototype with Multiple Focal Distances," *ACM Trans. Graph.*, 23, 3, August 2004, pg. 804-813; and Wetzstein, G., Lanman, D., Hirsch, M., and Raskar, R., "Tensor Displays: Compressive Light Field Synthesis using Multilayer Displays with Directional Backlighting," *ACM Trans. Graph. (Proc. SIGGRAPH)*, 31, 4, July 2012, pg. 80:1-80:11.). The above-mentioned trends make the multi-view autostereoscopic display a promising solution.

Automultiscopic screens preferably produce a light field, which may include a continuous four-dimensional (4D) function representing radiance with respect to a position and a viewing direction (see for example, the following publication: Levoy, M., and Hanrahan, P., "Light Field Rendering," in *Proceedings of the 23rd Annual Conference on Computer Graphics and Interactive Techniques*, ACM, August 1996, pg. 31-42). Due to the discrete nature of an acquisition (i.e., limited number of views), a recorded light field is preferably aliased. A plenoptic sampling theory analyzes the spectrum of a reconstructed light field (see for example, the following publications: Chai, J. X., Tong, X., Chan, S. C., and Shum, H. Y., "Plenoptic Sampling," in *Proceedings of the 27th annual conference on Computer graphics and interactive techniques*, ACM Press/Addison-Wesley Publishing Co., July 2000, pg. 307-318; and Isaksen, A., McMillan, L., and Gortler, S. J., "Dynamically Reparameterized Light Fields," in *Proceedings of the 27$^{th}$ Annual Conference on Computer Graphics and Interactive Techniques*, ACM Press/Addison-Wesley Publishing Co., July 2000, pg. 297-306).

Based on the above-mentioned existing approaches, some techniques allow for antialiasing of the recorded light field (see Isaksen, A., McMillan, L., and Gortler, S. J., "Dynamically Reparameterized Light Fields," in *Proceedings of the 27$^{th}$ Annual Conference on Computer Graphics and Interactive Techniques*, ACM Press/Addison-Wesley Publishing Co., July 2000, pg. 297-306; and Stewart, J., Yu, J., Gortler, S. J., and McMillan, L., "A New Reconstruction Filter for Undersampled Light Fields," in *Proceedings of the 14th Eurographics workshop on Rendering*, Eurographics Association, June 2003, pg. 150-156). In the context of an automultiscopic display, aliasing may be due to undersampling of the light field and also because of the limited bandwidth of the display. One approach (see Zwicker, M., Matusik, W., Durand, F., and Pfister, H., "Antialiasing for Automultiscopic 3D Displays," in *Proceedings of the 17th Eurographics conference on Rendering Techniques*, Eurographics Association, June 2006, pg. 73-82, hereinafter "Zwicker"), takes both sources of aliasing (undersampling and limited bandwidth, respectively) into account and presents a combined antialiasing framework which filters input views coming from a camera array. However, in the approach of Zwicker, a large number of views is preferably used, which may make the solution in Zwicker impractical in a scenario when 3D stereo content (two views) is available.

A sequence of images, preferably used for an automultiscopic display, preferably corresponds to a set of views captured from different locations. Such a sequence of views may be captured by a camera moving horizontally on a straight line. The problem of creating additional views may be considered as similar to a motion editing problem when the motion in the scene comes from the camera movement.

A number of techniques may magnify invisible motions. For example, in the Lagrangian approach, motion is explicitly estimated and then magnified, and an image based technique is used to compute frames that correspond to a modified flow (see for example, the following publication that is hereby incorporated by reference: Liu, C., Torralba, A., Freeman, W. T., Durand, F., and Adelson, E. H., "Motion Magnification," *ACM Trans. Graph.*, 24, 3, July 2005, 519-526). A Eulerian approach may eliminate the need of flow computation. Instead of using flow computation, the Eulerian approach processes the video in space and time to amplify the temporal color changes (see Wu, H. Y., Rubinstein, M., Shih, E., Guttag, J., Durand, F., and Freeman, W. T., "Eulerian Video Magnification for Revealing Subtle Changes in the World," *ACM Trans. Graph. (Proc. SIGGRAPH)* 31, 4, July 2012, pg. 65:1-65:8, hereby incorporated by reference). A phase-based technique benefits from the observation that in many cases motion may be encoded in a complex-valued steerable pyramid decomposition as coefficients variation (see Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, July 2013, pg. 80:1-80:10, hereby incorporated by reference, hereinafter "Wadhwa"). Compared to previous techniques, the method in Wadhwa does not require motion computation and may handle much bigger displacements then the Eulerian approach. In at least one embodiment, the method and system of the present invention is inspired by the methods of Wadhwa, and, as such, also does not require motion computation and may handle much bigger displacements then the Eulerian approach. In one embodiment, instead of estimating correspondence (depth) between two stereo views (e.g., a left view and a right view), correspondence is assumed to be encoded in the phase shift once the left and right views are decomposed into complex-valued steerable pyramids.

View Expansion

In one embodiment, using view expansion, the proposed approach (method and system of the present invention) takes as an input a standard 3D stereo video stream (e.g., left and right view), and creates additional views that may be used on an automultiscopic display. The proposed approach is inspired by a phase-based motion magnification technique. Therefore, to follow, a short overview is provided for this phase-based motion magnification method, and then an explanation is provided how the phase-based magnification method may be adapted to create additional views for an automultiscopic display.

Phase-Based Motion Magnification

Phase-based motion magnification exploits the steerable pyramid decomposition, which decomposes images according to the spatial scale and orientation. See for example, the following publications that are hereby incorporated by reference: Simoncelli, E. P., Freeman, W. T., Adelson, E. H., and Heeger, D. J., "Shiftable Multiscale Transforms," *IEEE Transactions on Information Theory*, 38, 2, March 1992, pg. 587-607; Simoncelli, E. P., and Freeman, W. T., "The Steerable Pyramid: A Flexible Architecture for Multi-Scale Derivative Computation," in *IEEE International Conference on Image Processing*, vol. 3, October 1995, pg. 444-447. If the input signal is a sine wave, a small motion may be encoded in the phase shift between frames. Therefore, the motion may be magnified by modifying the temporal changes of the phase.

In order to compute the steerable pyramid, a series of filters $\Psi_{\omega,\Theta}$ may be used. These filters may correspond to one filter, which may be scaled and rotated according to the scale $\omega$ and the orientation $\Theta$. The steerable pyramid may then be built by applying the filters to the discrete Fourier transform (DFT) $\tilde{I}$ of each image I from the video sequence. In this manner, a given frame may be decomposed into a number of frequency bands $S_{\omega,\Theta}$ which have DFT $\tilde{S}_{\omega,\Theta} = \tilde{I}\Psi_{\omega,\Theta}$. One advantage of such a decomposition is that the response of each filter may be localized, which enables processing of phases locally.

A one-dimensional (1D) case is considered, e.g., a 1D intensity profile $f$ translating over time with a constant velocity, in order to provide a non-limiting example of how the phase-based motion magnification works. If the displacement is given by a function $\delta(t)$, the image changes over time according to $f(x+\delta(t))$. The function $f(x+\delta(t))$ may be expressed in the Fourier domain as a sum of complex sinusoids:

$$f(x + \delta(t)) = \sum_{\omega=-\infty}^{\infty} A_\omega e^{i\omega(x+\delta(t))}, \quad (1)$$

where $\omega$ is a single frequency and A is amplitude of the sinusoid. From this, a band corresponding to the frequency $\omega$ is given by:

$$S_\omega(x,t) = A_\omega e^{i\omega(x+\delta(t))}. \quad (2)$$

The $\omega(x+\delta(t))$ is the phase of the sinusoid, and $\omega(x+\delta(t))$ may include the motion information which may be directly amplified. However, changing individual phases may not lead to meaningful motion editing because the motion may be encoded in the relative changes of the phase over time. To amplify motion, first, the phase may be filtered in the temporal direction to isolate desired phase changes, $B_\omega(x,t)$. Next, the filtered phase may be multiplied by a magnification factor $\alpha$, and the original phase in band $S_{\omega,\Theta}$ may be increased by the amplified signal $B_\omega(x,t)$. Assuming that the filtering applied to the phase removes (direct current) DC components, the new modified sub-band with amplified motion is:

$$\hat{S}_\omega(x,y) = \tilde{S}_\omega(x,y) e^{i\alpha B_\omega(x,t)} = A_\omega e^{i\omega(x+(1+\alpha)\delta(t))}. \quad (3)$$

The above-mentioned method generalizes to the two-dimensional (2D) case, where the steerable pyramid decomposition uses filters with a finite spatial support, thereby enabling detecting and amplifying local motions. Additional details regarding the above-mentioned method may be found in the following publications, which are hereby incorporated by reference: Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, July 2013, pg. 80:1-80:10; and U.S. patent application Ser. No. 13/607,173, filed on Sep. 7, 2012, now U.S. Patent Publication No. 2014/0072228, published on Mar. 13, 2014.

Proposed Approach

Applicants' proposed approach takes a stereoscopic stream as an input and produces a correctly filtered multi-view video for a given automultiscopic display (see the electronic color version of the following paper that uses the proposed approach, hereby incorporated by reference: Didyk, P., Sitthi-Amorn, P., Freeman, W. T., Durand, F., and Matusik, W., "Joint View Expansion and Filtering for Automultiscopic 3D Displays," *ACM Trans. Graph.*, 32, 6, November 2013, Article No. 221, hereinafter "Applicants' paper").

FIG. 1A illustrates the method and system 100 presented by Applicants that takes a stream of stereo images as an input 102 and synthesizes (and/or creates) additional (and/or output) views 104 that are preferably used for an automultiscopic display. The output views 104 are also filtered by the method and system 100 to remove inter-view aliasing.

Figure 1B:
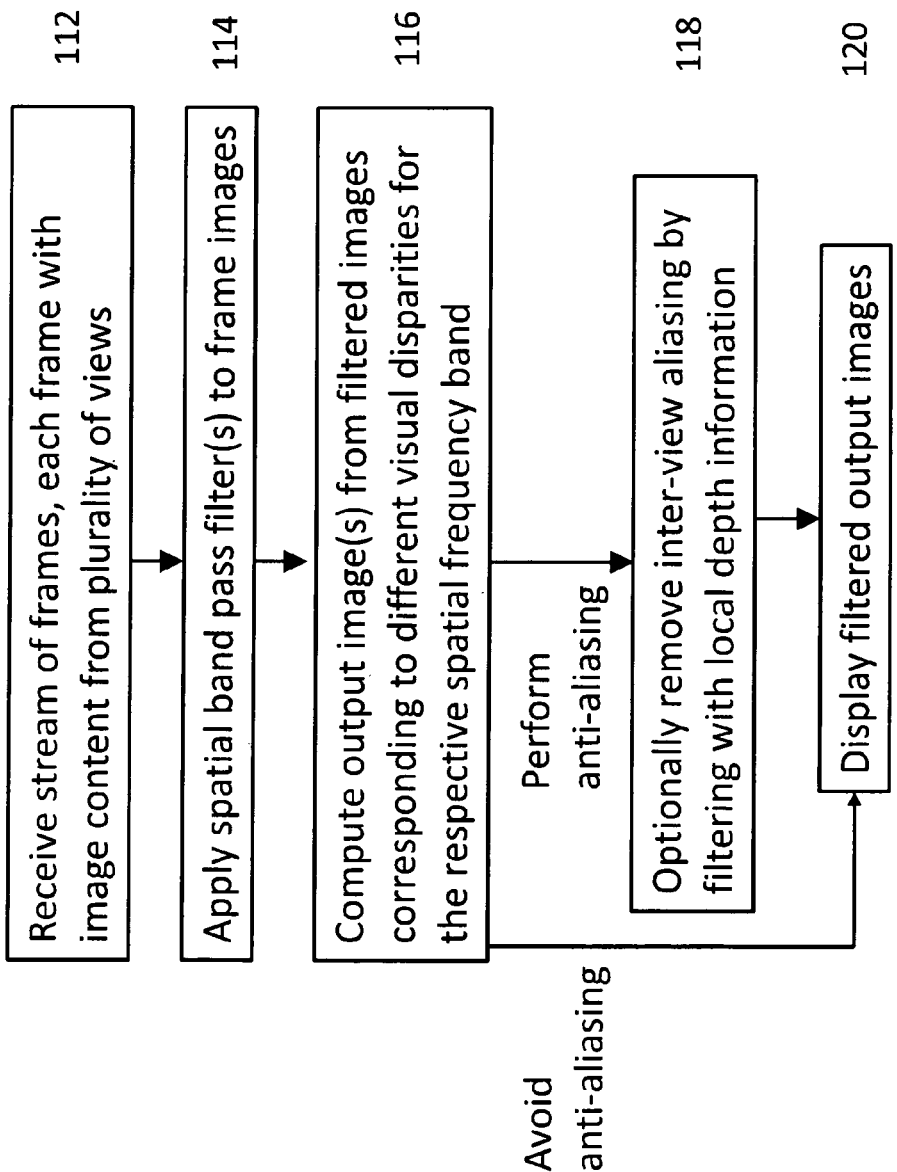
FIG. 1B illustrates a non-limiting flow-chart of the present invention method and system of FIG. 1A.

FIG. 1B illustrates a non-limiting flow-chart of the present invention method and system 100 of FIG. 1A. An embodiment includes a computer-implemented method that uses at least one processor and at least one associated memory. The embodiment 100 receives 112 a video stream formed of a sequence of frames. Each frame may have image content corresponding to a plurality of views, and the views may be initial views. Next, the system/method 100 applies 114 one or more spatial band pass filters to the received image content resulting in filtered images. Each spatial band pass filter may have a respective spatial frequency band. From the filtered images, the system/method 100 computes 116 one or more output images that synthesize additional views with respect to the initial views. The output images may be computed from the filtered images of a given spatial band pass filter corresponding to different visual disparities for the respective spatial frequency band of that given band pass filter. The computing of output images may perform anti-aliasing as an option 118. That is, system/method 100 allows at 118 optionally including removing inter-view (inter-perspective) aliasing by filtering the output images according to local depth using phase shift instead of recovering depth information. Lastly, system/method 100 drives a display with the computed and optionally anti-aliased filtered output images, rendering a multi-view autostereoscopic 3D video display 120.

Figure 2:
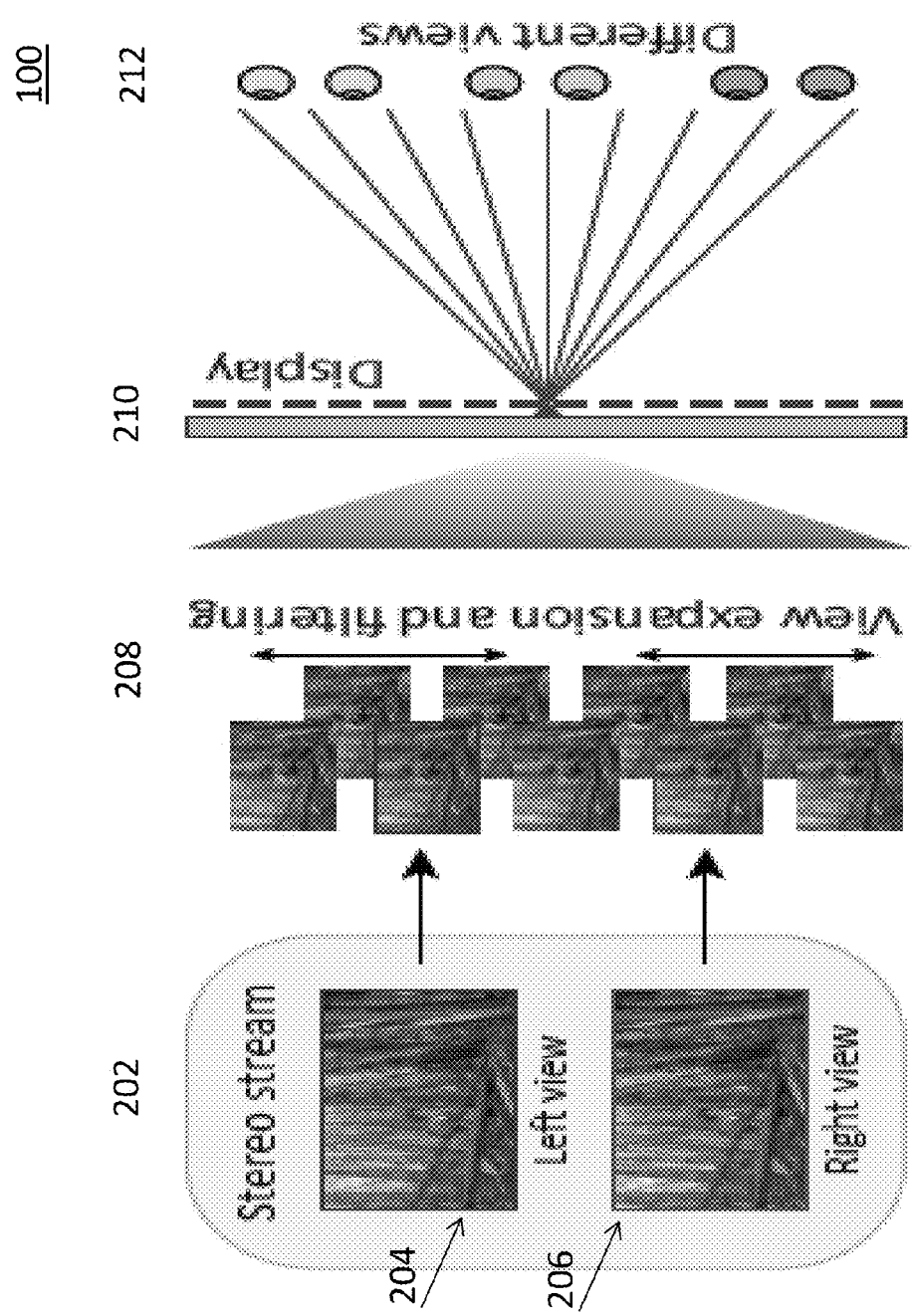
FIG. 2 is a schematic view of the present invention method and system that takes a 3D stereo stream as an input, and performs a view expansion together with an antialiasing filtering to obtain a correct input for an automultiscopic display. ("Sintel" © by Blender Foundation).

FIG. 2 depicts a schematic view of the proposed approach 100 that takes a 3D stereo stream as an input 202, and performs a view expansion together with antialiasing filtering 208 to obtain a correct input for an automultiscopic display 210 with different views 212.

As illustrated in FIG. 2, in order to expand 3D stereo content to a multi-view video stream, the following observation is made. Similarly to motion magnification, where the motion information may be mostly encoded in the phase change, the parallax between two neighboring views may be encoded in the phase difference. In one embodiment, FIG. 2 illustrates two frames (left 204 and right 206).

Figure 3:
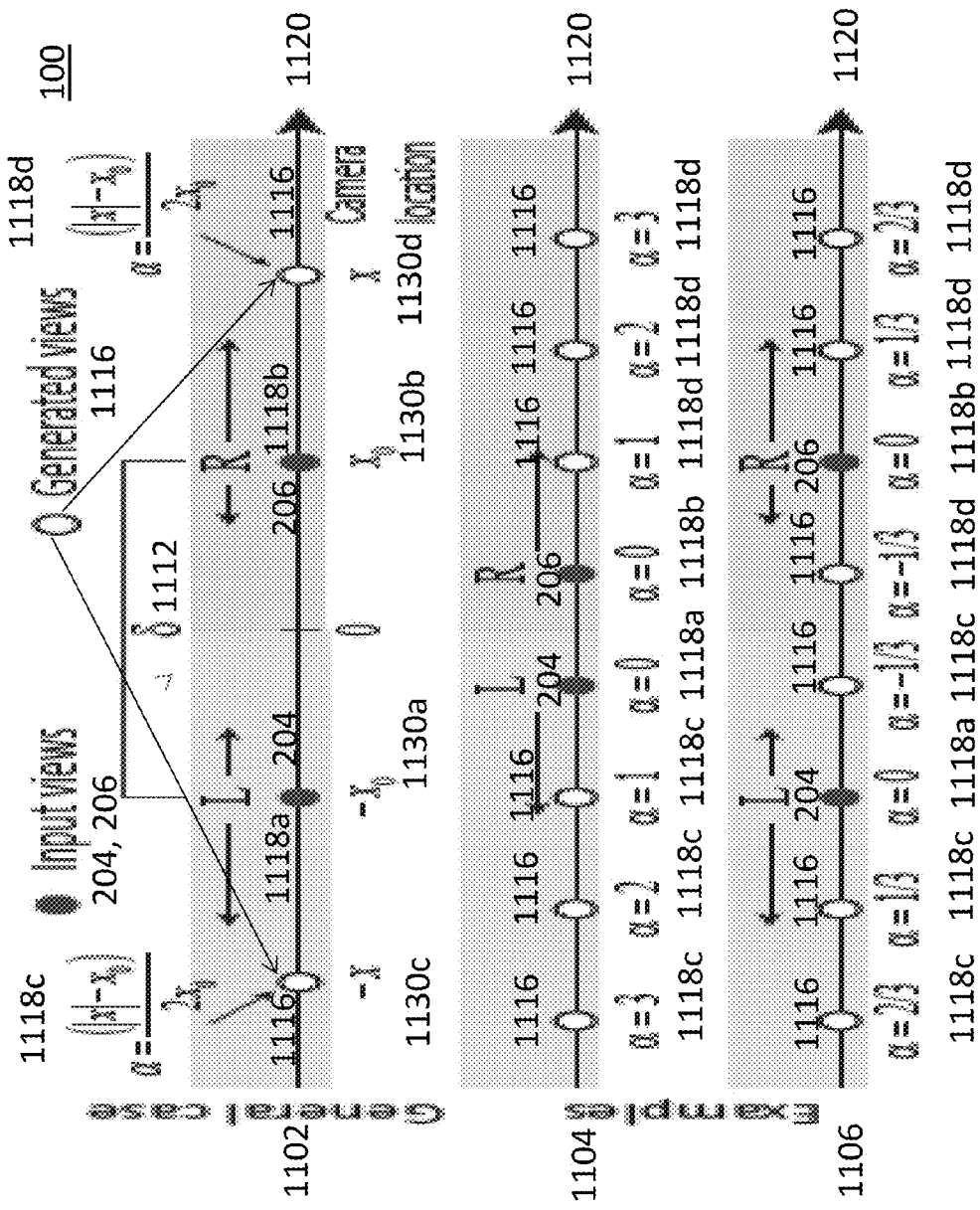
FIG. 3 is a graph illustration of an embodiment of Applicants' view expansion.

FIG. 3 illustrates various graphical embodiments of Applicants' method and system 100 of the present invention, including the view expansion process. A magnification factor α (see elements 1118a, 1118b, 1118c, and 1118d in FIG. 3) is preferably adjusted according to the position of the virtual camera 1120 for which the view is generated. The present invention method and system 100 may synthesize new views (e.g., create generated views, 1116) in an outward direction (as shown in cases 1102, 1104, 1106), but also interpolate in-between views (as shown in case 1106). New views (1116) may be reconstructed from one or more input images 204, 206 corresponding to the closest location. For example, in cases 1102, 1104, 1106, a given left input image 204 may be used to reconstruct one or more images 1116 to the left of the given image 204 (see corresponding blue regions in FIG. 3). Also, in cases 1102, 1104, 1106, a given right input image 206 may be used to reconstruct one or more images 1116 to the right of the given image 206 in FIG. 3 (see corresponding locations in green regions in FIG. 3).

Similarly to FIG. 2 which has a left frame 204 and right frame 206, in an embodiment, FIG. 3 illustrates cases 1102, 1104, 1106 with a left frame 204 and a right frame 206. In FIG. 3, instead of analyzing the phase changes in the temporal domain, the present invention method and system accounts for phase differences in corresponding bands between two input views 204, 206. In at least one embodiment, a notion of time is not required, so phase shift is therefore denoted as δ (1112), instead of δ(t) (indicating a time variable), in the description to follow.

As illustrated in the example cases 1102, 1104, 1106 of FIG. 3, in order to create the additional views 1116, the present invention method and system 100 may take two or more input views that are also one or more left stereo frames, L (204), and one or more right stereo frames, R (206), and perform the steerable pyramid decomposition on both left and right frames 204, 206, respectively. Then, the present invention method and system 100 may compute the phase difference for each complex coefficient. After modifying the phase differences according to the a value (see elements 1118a, 1118b, 1118c, and 1118d in FIG. 3) and collapsing the pyramids, two or more nearby views are created (see elements 1116). In at least one embodiment, an advantage of the present invention method and system 100 is that it provides a stereo disparity expansion without a requirement of dense depth map reconstruction, thereby avoiding the significant artifacts which dense depth map reconstruction is prone to.

A process of the present invention method and system 100, processR̂, may be defined as follows:

$$(L', R') = M(L, R, \alpha), \quad (4)$$

where M is the view generation process, and L' and R' are the nearby views 1116 according to the magnification factor α (see elements 1118a, 1118b, 1118c, and 1118d in FIG. 3). The magnification factors may be computed based on virtual camera positions 1120 that the images correspond to. The input images may coincide with locations $-x_0$ (1130a) and $x_0$ (1130b), corresponding to the left view, L (204), and the right view, R (206), respectively. The magnification factor for an arbitrary location x on a given x-axis 1120 preferably is set to $\alpha = (|x| - x_0)/(2x_0)$, referring to α (see elements 1118a, 1118b, 1118c, and 1118d in FIG. 3). Because a new image is preferably reconstructed from the input view which is closest to the new location, location x (1130d) and location $-x$ (1130c) preferably use the same α value (1118d, 1118c, respectively). The process of choosing correct magnification factors (α values) is shown in FIG. 3. The FIG. 3 examples 1102, 1104, 1106 illustrate view expansion, preferably in an outward direction.

Antialiasing for Automultiscopic Display

The present invention method and system 100 for new views generation may produce images without interperspective aliasing. When producing images without interperspective aliasing, preferably the views are filtered according to the local depth. The process is similar to adding a depth-of-field effect.

A naïve and costly way to filter a single view is to generate a number of neighboring views and average them using weights corresponding to the distance from the original view. In contrast, a key advantage of the present invention method and system 100 is that it may perform the filtering directly on the steerable pyramid decomposition. The present invention method and system 100 may derive a closed form solution that may be performed at almost no additional cost computationally.

Filtering Equation

In one embodiment, the above defined function M may include two or more functions (for right and left views respectively): $M_R$ and $M_L$. The functions $M_R$ and $M_L$ may return one of the views, e.g., R' or L' respectively. The process of antialiasing may be analogous (and/or the same) for both right hand and left hand views R' and L'. The case of the right hand R' view is described as follows.

In order to be filtered, R' is preferably averaged with its neighboring views according to the weights given by a low pass filter along the viewpoint dimension. In one embodiment, the filter is given as a function $\mathcal{F}$. The anti-aliased view R̂' may correspond to fixed α value and R̂' may be computed as follows:

$$\hat{R}' = \int \mathcal{F}(\beta - \alpha) M_R(L, R, \beta) d\beta. \quad (5)$$

In order to perform the filtering directly on the pyramid decomposition, the present invention method and system 100 may approximate the above integration before the reconstruction of the pyramid for each sub-band of R' separately. In one embodiment, considering one band $\hat{S}_\omega(x, y, \alpha)$ of the decomposition of R', the corresponding filtered sub-band may be computed as:

$$\hat{S}_\omega(x, y, \alpha) = \int \mathcal{F}(\beta - \alpha) \cdot \hat{S}_\omega(x, y) d\beta, \quad (6)$$

which may be further transformed:

$$\tilde{S}_\omega(x, y, \alpha) = \int \mathcal{F}(\beta - \alpha) \cdot A_\omega e^{i\omega(x + (1+\beta)\delta)} d\beta \quad (7)$$

$$= A_\omega e^{i\omega(x + \delta(t))} \int \mathcal{F}(\beta - \alpha) \cdot e^{i\omega\beta\delta} d\beta \quad (8)$$

$$= S_\omega(x, y) \int \mathcal{F}(\beta - \alpha) \cdot e^{i\omega\beta\delta} d\beta. \quad (9)$$

In one embodiment, the final filtered sub-band may include two components. The first component, $S_\omega(x,y)$, may comprise a sub-band of the original view R. The second component may comprise the corresponding integral component, $\int F (\beta-\alpha) \cdot e^{i\omega\beta\delta} d\beta$, which preferably depends on phase shift $\delta$. The dependence on $\delta$ may be convenient because in many cases the final filtered sub-band may have a closed form solution, or it may be pre-computed and stored as a lookup table parameterized by phase shift $\delta$.

In one embodiment, $F$ may comprise a Gaussian filter:

$$F_\sigma(\beta) = \frac{1}{\sqrt{2\pi} * \sigma} \cdot e^{-\frac{\beta^2}{2\sigma^2}}, \qquad (10)$$

which may result in each sub-band of view R' being:

$$\tilde{S}_\omega(x, y, \alpha) = \frac{\sigma}{2} \cdot e^{i\alpha\delta - \sigma^2\delta^2/2} \cdot S_\omega(x, y). \qquad (11)$$

In at least one embodiment, the above equations for $\tilde{S}_\omega(x,y,\alpha)$ preferably assume a good estimation of the phase shift $\delta$. A phase-based approach (see for example, the following publication that is hereby incorporated by reference: Wadhwa, N., Rubinstein, M., Guttag, J Durand, F., and Freeman, W. T., "Phase-Based Video Motion Processing," *ACM Trans. Graph.* (*Proc. SIGGRAPH*), 32, 4, July 2013, pg. 80:1-80:10) may underestimate the phase shift $\delta$, which may lead to insufficient filtering. Insufficient filtering may occur when the assumption that the correspondence between two views encoded in the phase difference fails. The present invention method and system 100 overcomes the above-mentioned deficiency by correcting the phase shift in each sub-band separately, based on the phase shift in the corresponding sub-band for the lower frequency. In one embodiment, before applying the factor responsible for the filtering, the present invention method and system 100 processes the entire pyramid, starting from the lowest frequency level. Whenever the phase shift on the level below is greater than $\pi/2$ (90 degrees), the phase shift at the current level may be underestimated. In such a case, the present invention method and system 100 corrects the phase shift by setting its value to twice the phase shift on the lower level. Therefore, the present invention method and system 100 provides a correct phase shift estimation, preferably under the assumption that the correspondence between the input views behaves locally as a translation. Although the correct phase shift estimation may not be crucial for the motion magnification or nearby view synthesis, correct phase shift estimation may be important for the correct antialiasing filtering.

Results

Various embodiments implementing the above approach are provided. In one embodiment, implementation details and standard running times are included. In an embodiment, detailed comparison is provided between the present invention method and system 100 and a state-of-the-art depth image-based rendering technique (DIBR). In an embodiment, a real-time 3D video conferencing system is presented, in order to showcase the advantages of robustness and efficiency of the inventive method. In an embodiment, the present invention method and system 100 is applied to depth remapping.

Implementation Details

In one embodiment, the present invention method and system 100 is implemented on a GPU using CUDA (Compute Unified Device Architecture) API (Application Programming Interface), and processes sequences using a NVIDIA GTX TITAN graphics card on an INTEL XEON machine. In one embodiment, the corresponding steerable pyramid uses eight orientations, which provides a good trade-off between quality and performance. In one embodiment, preferably, the time expended in building a pyramid and reconstructing one additional view is independent of the image content, and it is preferably 15 ms (milliseconds) and 12 ms for building and reconstructing respectively, assuming a content with 816×512 resolution. The present invention method and system 100 enables reconstruction of eight views for a standard automultiscopic display at a rate of 8.3 FPS (frames per second). An advantage of the present invention method and system 100 is that its memory requirement is relatively low. In one embodiment, each pyramid preferably requires 137 MB (megabytes) of memory. Hence, in one embodiment, to process an input stereo sequence, 3×137 MB of memory is required (that is, 2×137 MB for two input views and 137 MB for the synthesized view).

Comparison to Depth-Based Techniques

Existing real-time methods fail to directly compute properly filtered content for automultiscopic 3D displays based on a stereoscopic video stream. In order to compare existing real-time methods against the present invention method and system 100, a following comparison is made between the present invention method and system 100 and a combination of depth-based rendering and antialiasing (e.g., a hypothetical competitive method). The hypothetical competitive method takes a stereoscopic video stream as an input, and reconstructs a depth map for each image pair. Then, the competitive method applies a real-time warping technique for synthesis of additional views. In order to obtain one antialiased view, the competitive method averages 30 neighboring views according to Gaussian weights similar to those that are mentioned above. For estimating depth, a recent technique is used (see Hosni, A., Rhemann, C., Bleyer, M., Rother, C., and Gelautz, M., "Fast Cost-Volume Filtering for Visual Correspondence and Beyond," *IEEE Transactions on Pattern Analysis and Machine Intelligence*, 35, 2, February 2013, pg. 504-511, incorporated herein by reference). A view synthesis is applied which is similar to an existing approach (see Didyk, P., Ritschel, T., Eisemann, E., Myszkowski, K., and Seidel, H.-P., "Adaptive Image-space Stereo View Synthesis," in *Proc. VMV*, November 2010, 8 pages, incorporated herein by reference). A combination of the two above-mentioned techniques provides a good trade-off between quality and performance.

The above-mentioned depth-based rendering is compared with the present invention method and system 100 in at least three non-limiting example embodiments to follow. Two of the example embodiments are computer generated animations (FIGS. 4A-4D and FIG. 5). The third example embodiment (FIG. 6) is a photograph taken using a 3D camera (an LG OLYMPUS P725 camera). The third example is particularly challenging because the captured scene may include both reflections and transparent objects.

Figure 4A:
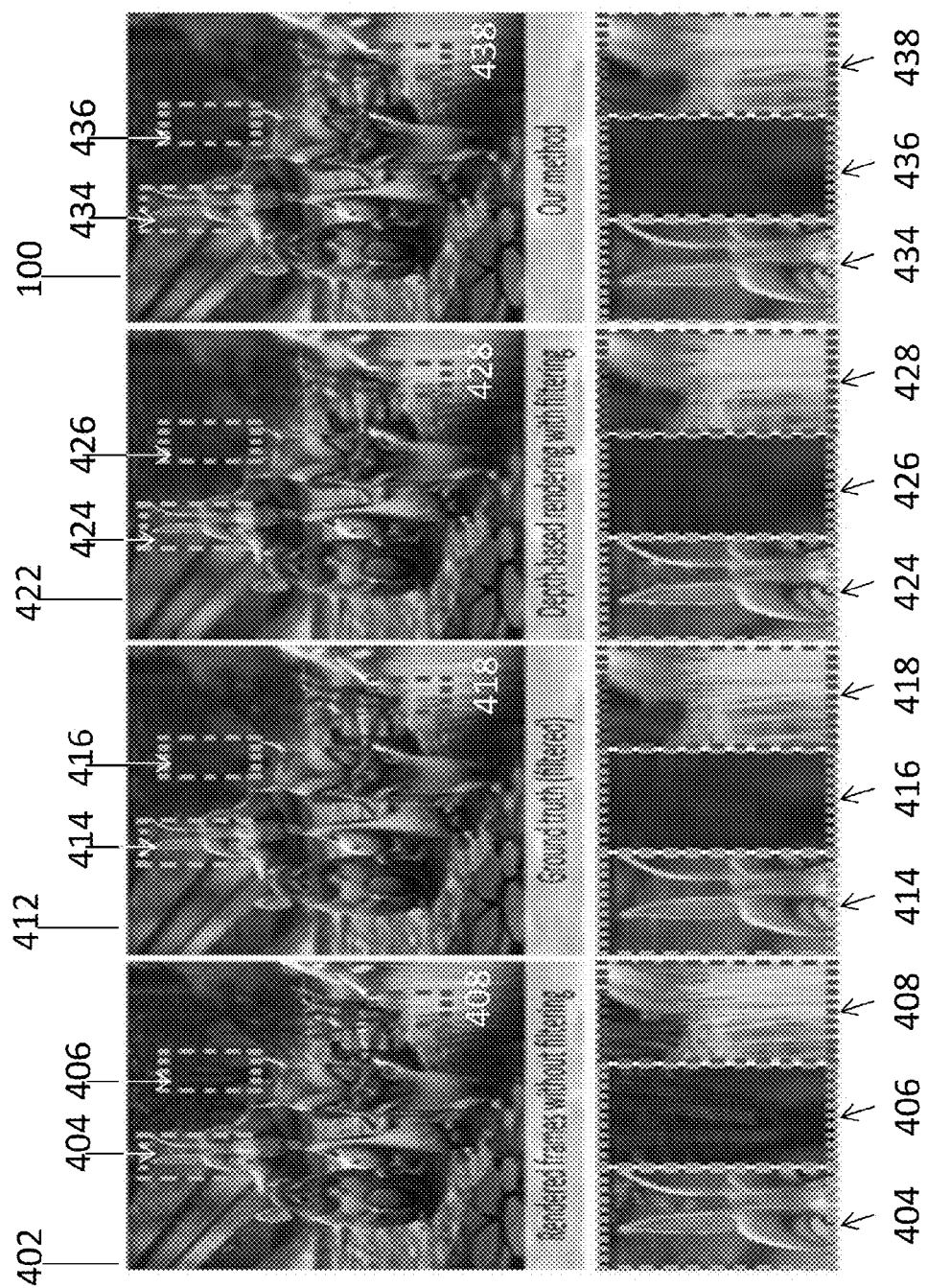
FIGS. 4A-4D show embodiments of an automultiscopic display that provide superior image artifact handling, as compared with the existing approaches of ground truth and depth-based rendering. ("Big Buck Bunny" © by Blender Foundation).
Figure 4B:
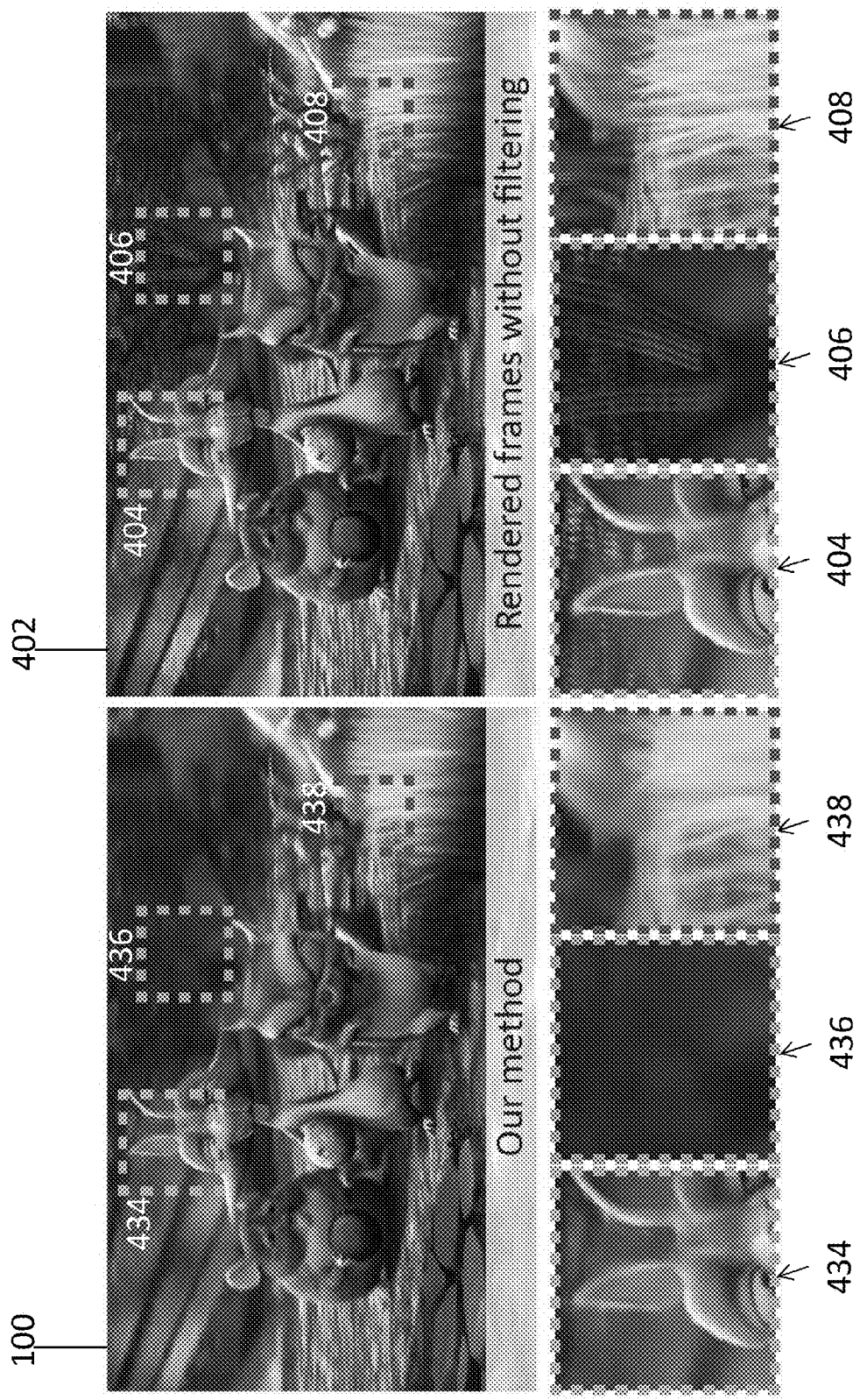
Figure 4C:
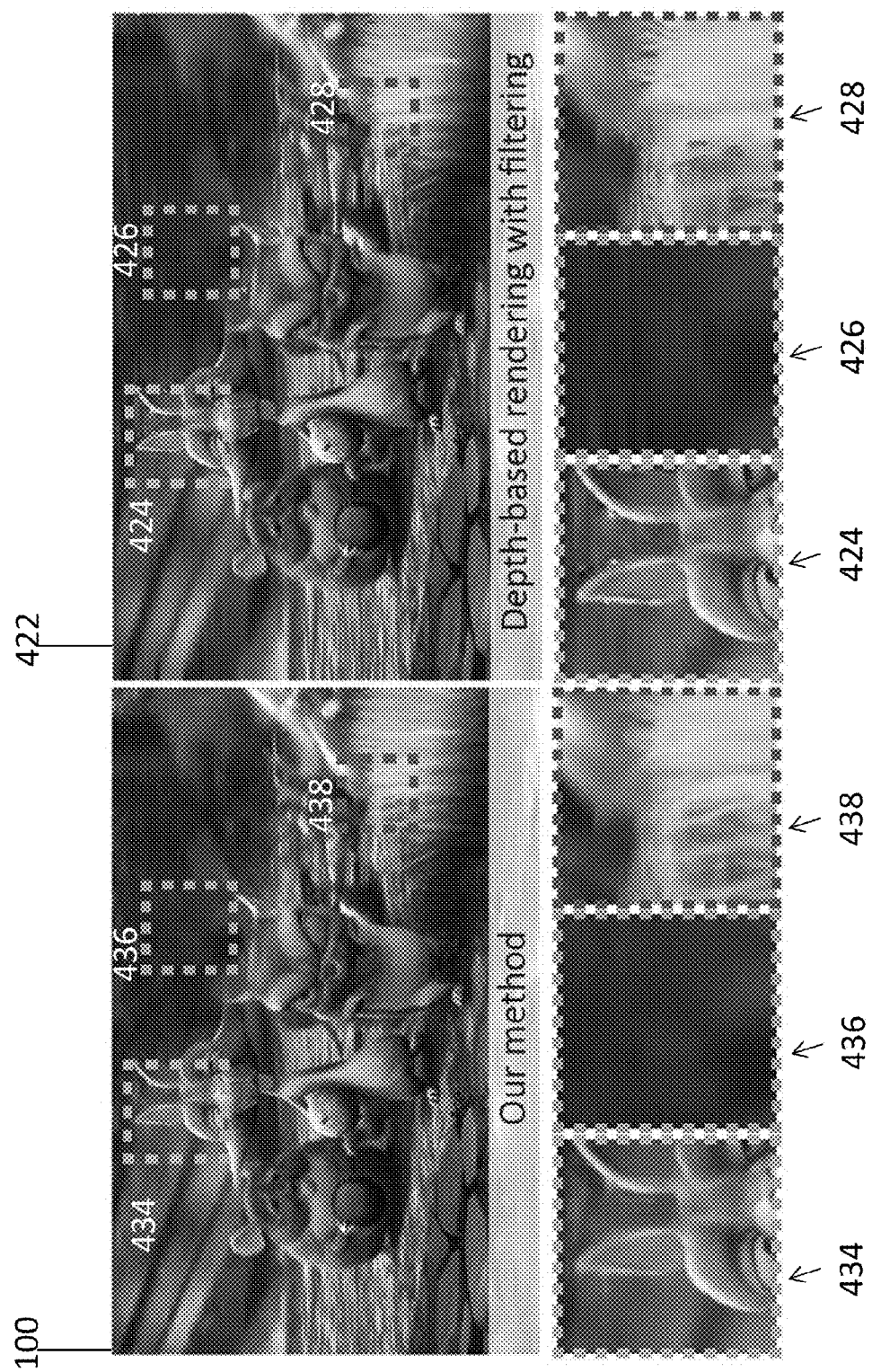
Figure 4D:
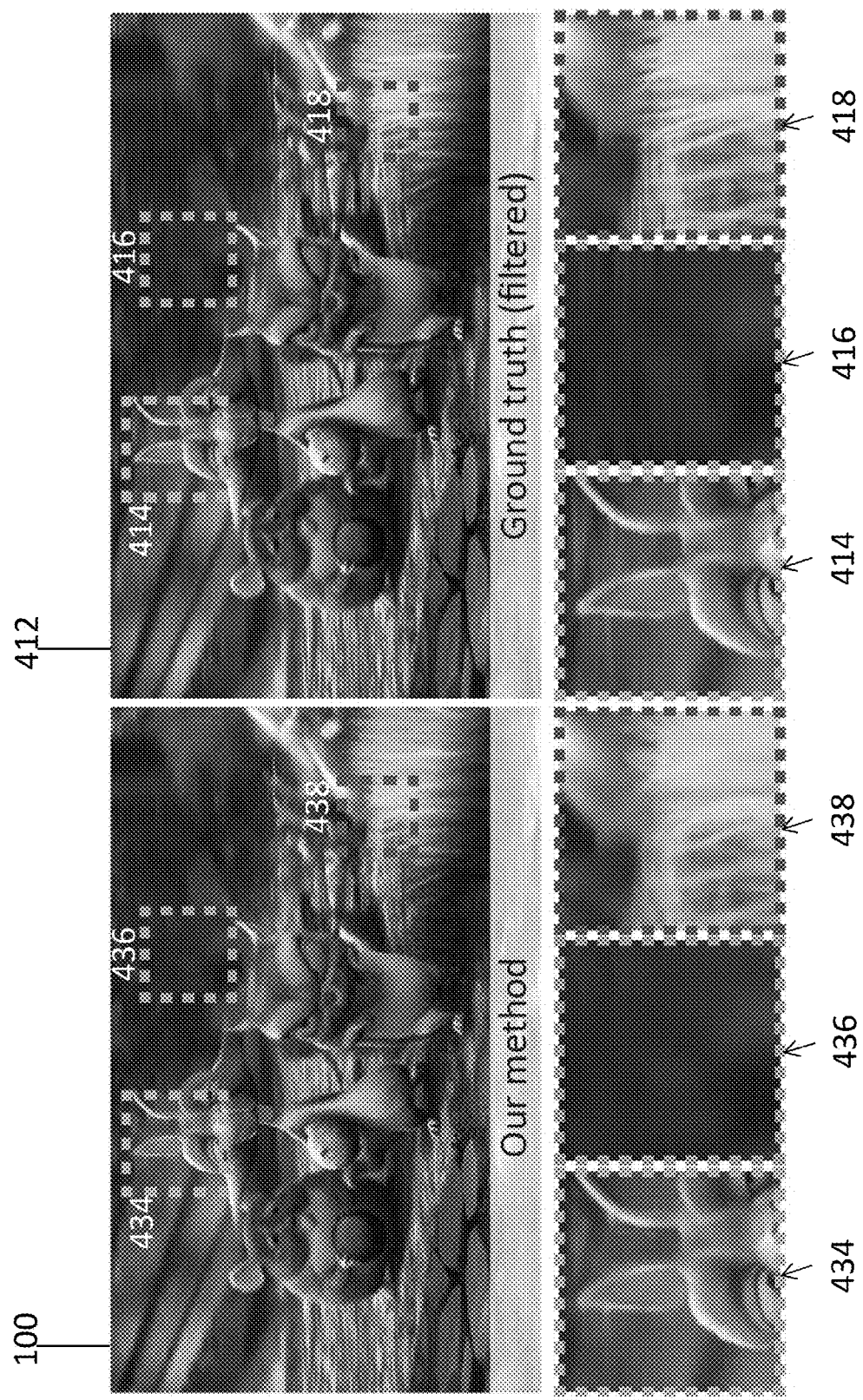

For the sequence from FIGS. 4A-4D, a dense light field is computed (a hundred views for non-limiting example). The dense light field enables the use of a ground truth method 412, e.g., the antialiasing technique proposed by Zwicker, M., Matusik, W., Durand, F., and Pfister, H., "Antialiasing for Automultiscopic 3D Displays," in *Proceedings of the 17th Eurographics conference on Rendering Techniques*, Eurographics Association, June 2006, pg. 73-82. FIG. 4A shows a comparison of different content creation approaches for automultiscopic display. In FIG. 4A, in existing approaches 402, 412, 422, frames are rendered but antialiasing is not applied, resulting in a significant ghosting visible for objects located further from the screen plane (see green insets 406, 416, 426), which is a deficiency that may be corrected by the method and system 100 of the present invention (see green inset 436) which may apply antialiasing. Ghosting artifacts may be removed when the content is filtered which may include rendering hundreds of views (412, 422). Although some artifacts 408 may be removed by filtering, existing image-based techniques combined with filtering, such as ground truth 412 or depth-based rendering 422 may introduce significant artifacts (see red insets, 418, 428, respectively) when depth estimation or ground truth fails. These artifacts (408, 418, 428) may be corrected by the method and system 100 of the present invention as shown in the red inset 438. Also in FIG. 4A, the blue inset 424 shows how incorrect depth estimation results in jaggy depth discontinuities that are not present in the other methods illustrated in FIG. 4A (see blue insets 404, 414, 434).

By comparison to existing techniques, the present invention method and system 100 produces results (see blue inset 434, green inset 436, and red inset 438) similar to rendering with filtering 422, but at improved costs that are similar to real-time image-based techniques. See also FIGS. 4B-4D that represent enlarged images of the elements of FIG. 4A, in order to further emphasize the above-mentioned improvements of the present invention.

Figure 5:
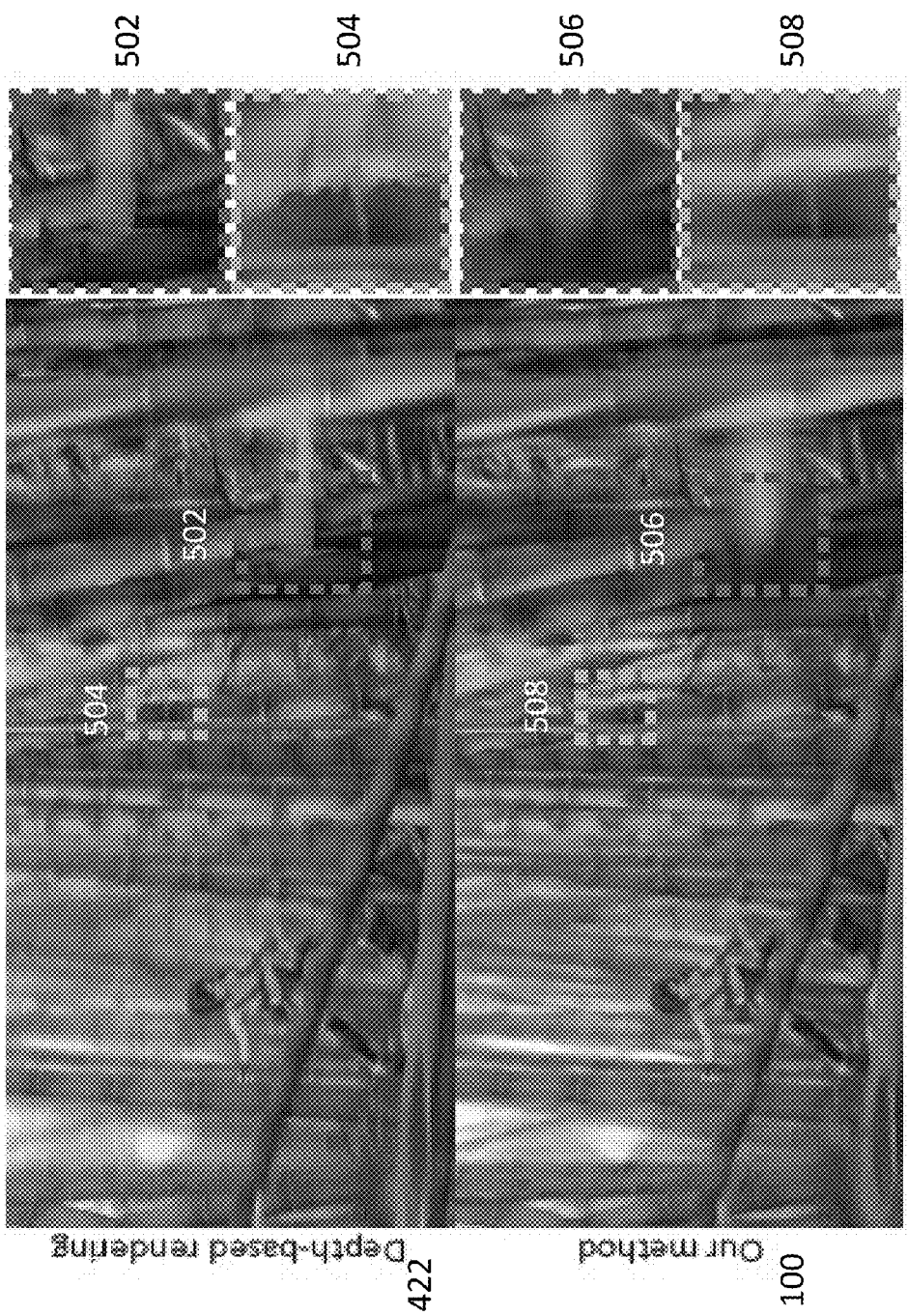
FIG. 5 shows another embodiment of an automultiscopic display that provides superior image artifact handling, as compared with the existing approach of depth-based rendering. ("Sintel" © by Blender Foundation).

FIG. 5 shows a comparison between the method and system 100 of the present invention and depth-based rendering 422 for one of the synthesized views. Please note the artifacts 502, 504 are due to the poor depth estimation for depth-based rendering 422. The blue inset 504 shows how incorrect depth estimation of depth-based rendering 422 results in jaggy depth discontinuities. By contrast, the counterpart blue inset 508 shows that these discontinuities are corrected by the method and system 100 of the present invention. Also illustrated in FIG. 5, in red inset 502, depth estimation of the depth-based rendering technique 422 fails in reconstructing depth of the out-of-focus butterfly. By contrast, as illustrated in the counterpart red inset 506, the method and system 100 of the present invention more accurately reconstructs the butterfly. Therefore, as illustrated in FIG. 5, the method and system 100 of the present invention produces more accurate (and/or correct) results compared with the depth-based rendering 422.

Figure 6:
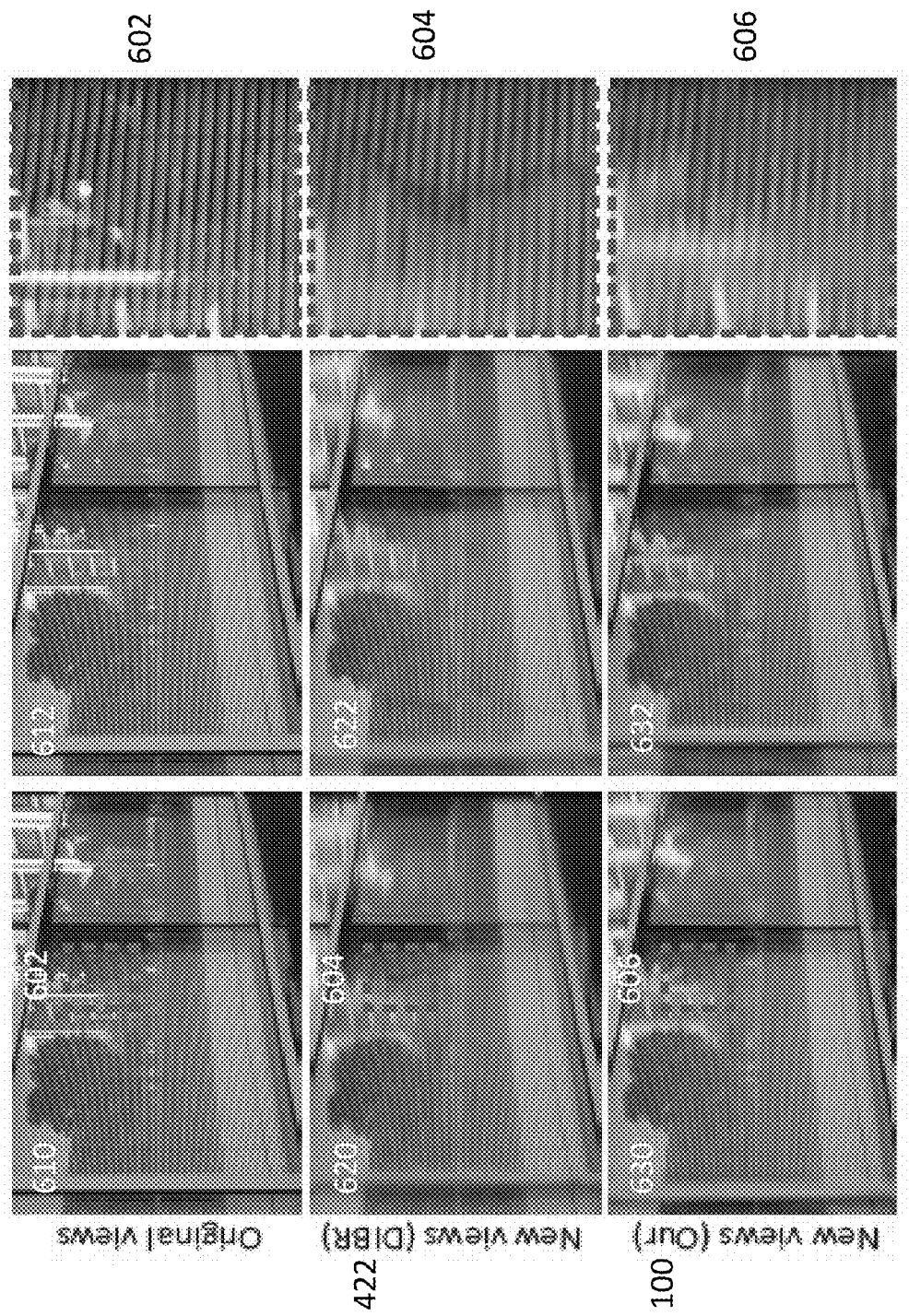
FIG. 6 illustrates an embodiment of an automultiscopic display that provides superior reconstruction of reflective and transparent objects, as compared with the existing approach of depth-image-based rendering (DIBR).

As illustrated in FIG. 6, transparent and highly reflective objects may be challenging for depth estimation and view synthesis methods. FIG. 6 shows the input images (top images 610, 612) and views that are generated using a depth image-based technique 422 (middle images 620, 622) and views that are generated using the method and system 100 of the present invention (bottom images 630, 632). As illustrated in FIG. 6, the depth estimation technique shown in images 620, 622 fails to reconstruct 604 the original highly reflective and transparent objects 602. By contrast, the method and system 100 of the present invention properly reconstructs 606 the original highly reflective and transparent objects 602.

As illustrated, at least in FIGS. 4A-4D and FIGS. 5-6, the method and system 100 of the present invention produces more graceful degradation of the image quality comparing to the depth-based rendering (DIBR) method 422. It is important to note that artifacts produced by the depth-based technique 422 are mostly due to poor depth estimation and not due to incorrect view-synthesis. Depth estimation is an ill-posed problem, and such existing DIBR methods 422 may not handle regions with non-obvious per-pixel depth values (e.g., transparencies, reflections, motion blur, defocus blur, and thin structures that have partial coverage) as shown in FIGS. 5-6. Real-time depth estimation methods 422 also have problems with temporal coherence. By contrast with DIBR 422, in at least one embodiment, the method and system 100 of the present invention improves results by avoiding producing visible and disturbing artifacts, even when coherence is not explicitly enforced. The improvements of the method and system 100 of the present invention is further illustrated in the video accompanying Applicants' paper mentioned above (see video that is hereby incorporated by reference, which is available on the Internet at people.csail.mit.edu, under the directory "pdidyk," followed by the sub-directory "projects," and the following sub-directory "MultiviewConversion," as the file "Multiview Conversion.mp4," and is also available on the Internet at www.youtube.com under the title "Joint View Expansion and Filtering for Automultiscopic 3D Displays," hereinafter "Applicants' video" of Nov. 5, 2013).

Figure 7:
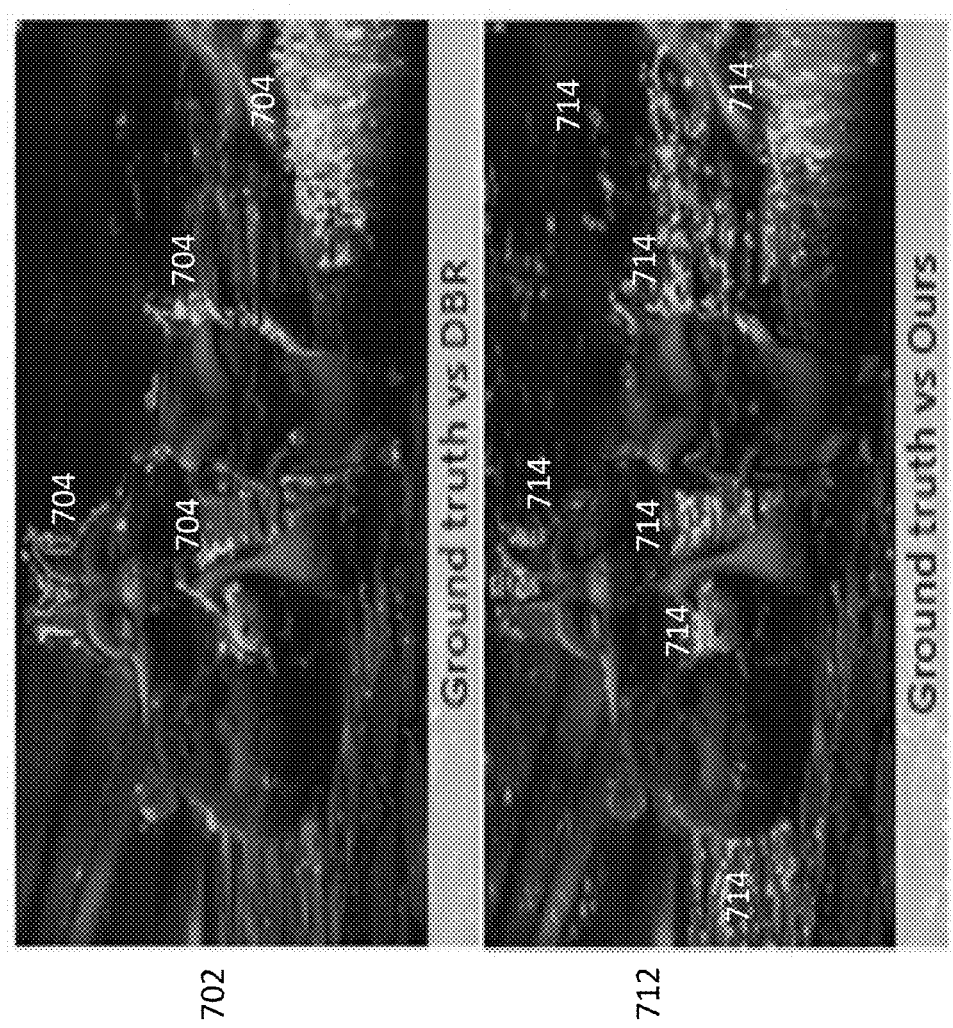
FIG. 7 is a colormap visualizing errors between depth-based rendering and ground truth (top), as well as errors between an embodiment of the present invention and ground truth (bottom), for the example embodiments from FIGS. 4A-4D. ("Big Buck Bunny" © by Blender Foundation).

FIG. 7 is a colormap visualizing errors between depth-based rendering and ground truth (top) 702, as well as visualizing errors between the method and system 100 of the present invention and ground truth (bottom) 712, for the examples from FIG. 4A. The differences (illustrated as errors 704, 714, predominantly illustrated through bright red and orange colors, but also illustrated through some usage of yellow and light green colors) are computed using the Structural Similarity Metric (SSIM metric) (see for example, the following publication that is hereby incorporated by reference: Wang, Z., Bovik, A. C., Sheikh, H. R., and Simoncelli, E. P., "Image Quality Assessment: From Error Visibility to Structural Similarity," *IEEE Transactions on Image Processing,* 13, 4, April 2004, pg. 600-612). As illustrated in FIG. 7, the error 704 produced by the depth-based technique is localized mostly around depth discontinuities in the image 702. By contrast, the error 714 produced by the method and system 100 of the present invention is distributed more uniformly across the image 712, and is therefore less disturbing.

In addition, in an embodiment, the error of the method and system 100 of the present invention may be significantly influenced by the different types of blur introduced by the compared methods. Referring back to FIG. 4A, while the ground-truth (412) and the depth-based (422) techniques filter images in the horizontal direction, an embodiment of the method and system 100 of the present invention may apply filtering that provides a more uniform blur, as illustrated in green inset 436 of FIGS. 4A-4D. In at least one embodiment, the method and system 100 of the present invention may filter images in both the horizontal direction and the vertical direction.

In one embodiment, the improved results produced by the method and system 100 of the present invention are a result of an over complete representation that it may use. While depth-based approaches estimate one depth value per pixel, which may lead to artifacts in complex cases where no such single value may exist, the method and system 100 of the present invention may capture the correspondence between views using phase differences for multiple spatial frequencies and orientations separately. In at least one embodiment, the local depth is not required to be represented as one value, and instead the local depth may be represented as many values, which may also lead to improved performance, including cases where the depth is not well-defined.

Standard 3D Stereo Content

To demonstrate the robustness of the method and system 100 of the present invention, it is successfully tested on various sequences. These sequences often may include severe compression artifacts, vertical misalignment, and visible color differences between cameras. The method and system 100 of the present invention may expand a stereoscopic video stream to a multi-view stream, and to display it on an 8-view automultiscopic screen. The method and system 100 of the present invention is shown to work well with these sequences, as illustrated at least in FIGS. 4A-4D and FIGS. 5-7. Video sequences are shown in the above-mentioned Applicants' video cited within Applicants' paper.

3D Video Conferencing System

In one embodiment, a light-weight, real-time 3D video conferencing system is built, based on the method and system 100 of the present invention, which may include a fast view expansion technique. An embodiment of the 3D video conferencing system is illustrated in Applicants' video. In one embodiment, the 3D video conferencing system comprises at least eight cameras mounted on a linear ring and an automultiscopic display, although the system is not so limited and may comprise more or less cameras. The system may operate in at least the two following modes: (1) the system may use the eight cameras to acquire eight corresponding views, or (2) the system may use two of the cameras and compute the other six views using the method and system 100 of the present invention. In both of the two modes, the eight views may be streamed in real-time to the screen, providing an interactive feedback for the users. See Applicants' video for the comparison between views captured using cameras and those generated using the method and system 100 of the present invention. Note that the views rendered by the method and system 100 of the present invention are filtered to avoid aliasing, which is advantageous because it does not add additional cost to the processing. In contrast, in existing approaches, original views captured by eight cameras may include aliasing. Such aliasing may be removed using the method presented by Zwicker, M., Matusik, W., Durand, F., and Pfister, H., "Antialiasing for Automultiscopic 3D Displays," in Proceedings of the 17th Eurographics conference on Rendering Techniques, Eurographics Association, June 2006, pg. 73-82, incorporated herein by reference, with the aid of depth image-based rendering. However, it may be prohibitively expensive for a real-time system.

Disparity Manipulations

The method and system 100 of the present invention may also be used for remapping disparities in stereoscopic images and videos. Such modifications are often desired and necessary in order to adjust disparity range in the scene to a given comfort range (see for example, the following publication that is hereby incorporated by reference: Lambooij, M., Ijsselsteijn, W., Fortuin, M., and Heynderickx, I., "Visual Discomfort and Visual Fatigue of Stereoscopic Displays: A Review," *Journal of Imaging Science and Technology*, 53, May-June 2009, pg. 030201-14), viewer preferences or for an artistic purpose (see for example, the following publication that is hereby incorporated by reference: Lang, M., Hornung, A., Wang, O., Poulakos, S., Smolic, A., and Gross, M., "Nonlinear Disparity Mapping for Stereoscopic 3D," *ACM Trans. Graph.*, 29, 4, July 2010, pg. 75:1-75:10). For example, NVIDIA 3D Vision may allow users to change depth range using a simple knob. Also, methods that target directly automultiscopic displays exist (see for example, the following publication that is hereby incorporated by reference: Didyk, P., Ritschel, T., Eisemann, E., Myszkowski, K., Seidel, H.-P., and Matusik, W., "A Luminance-Contrast-Aware Disparity Model and Applications," *ACM Trans. Graph.* (*Proc. SIGGRAPH Asia*), 31, 6, November 2012, pg. 184:1-184:10).

Using the method and system 100 of the present invention, disparity range in a given image may be changed by adjusting a corresponding α value in the above-mentioned view expansion of the method and system 100 of the present invention. The result of this adjustment is a global scaling of disparities. An example of such manipulations is presented in FIG. 8.

Figure 8:
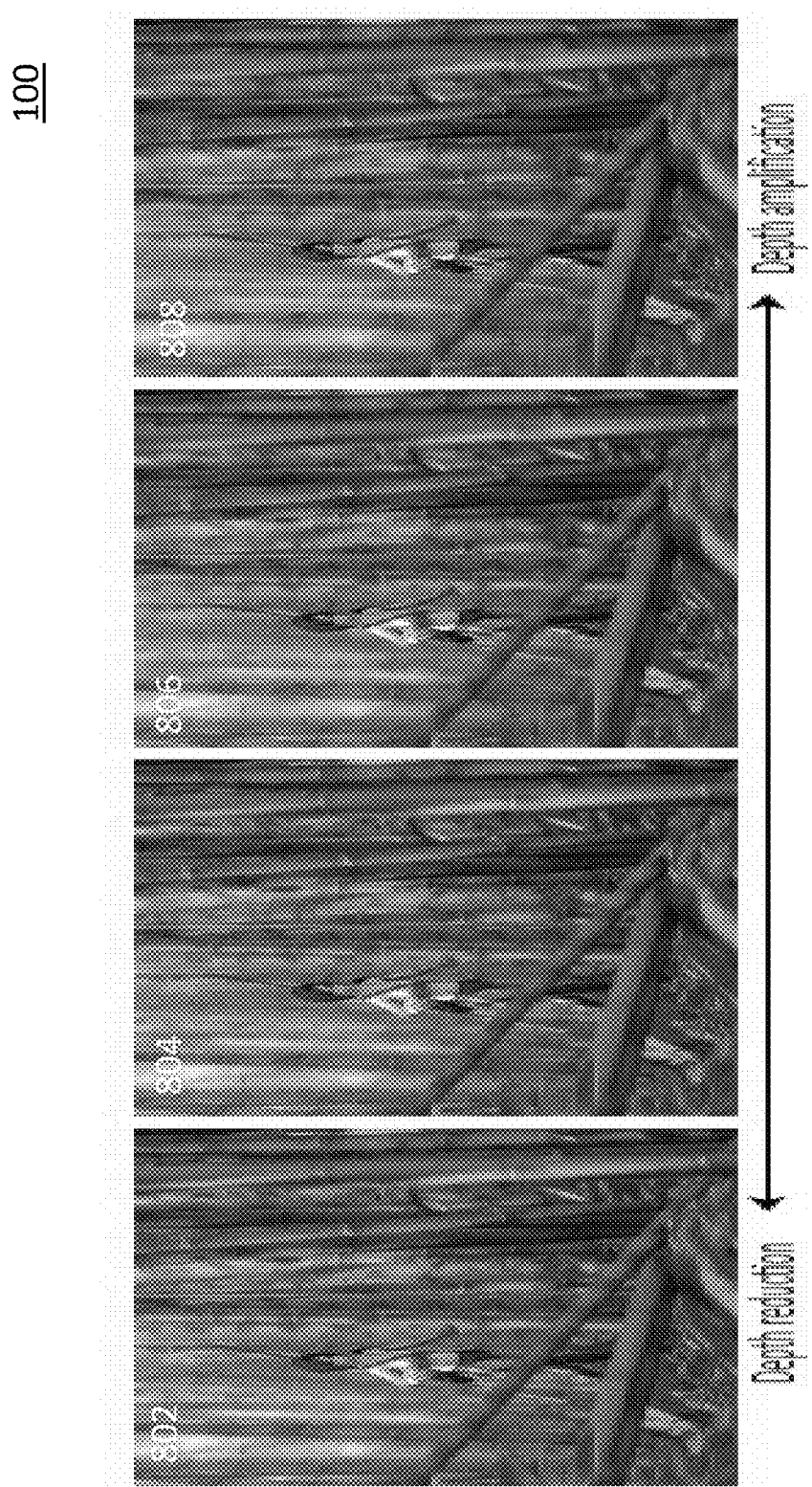
FIG. 8 illustrates that an embodiment of the present invention supports disparity manipulations. ("Sintel" © by Blender Foundation).

FIG. 8 illustrates that the method and system 100 of the present invention supports disparity manipulations. FIG. 8 shows stereo images in anaglyph (and/or anaglyph 3D) version (red channel for the left eye and cyan for the right one) 802, 804, 806, 808 for the same scene with different depth ranges (depth increasing from left to right).

In embodiments, 1D spatial band pass filters as well as 2D spatial band pass filters may be applied to the input stereoscopic images in the above described approach by Applicants. In the case of a 1D filter, user adjustments may be more general (i.e., not limited to changing the magnification factor α). Applicants' approach is able to perform disparity mapping, including disparity mapping which is defined as a function that maps the input disparity to the output disparity. The method and system 100 of the present invention enables the user to adjust the function that maps certain phase shift at a given frequency level (given spatial band pass filter) to a new phase shift.

Figure 9:
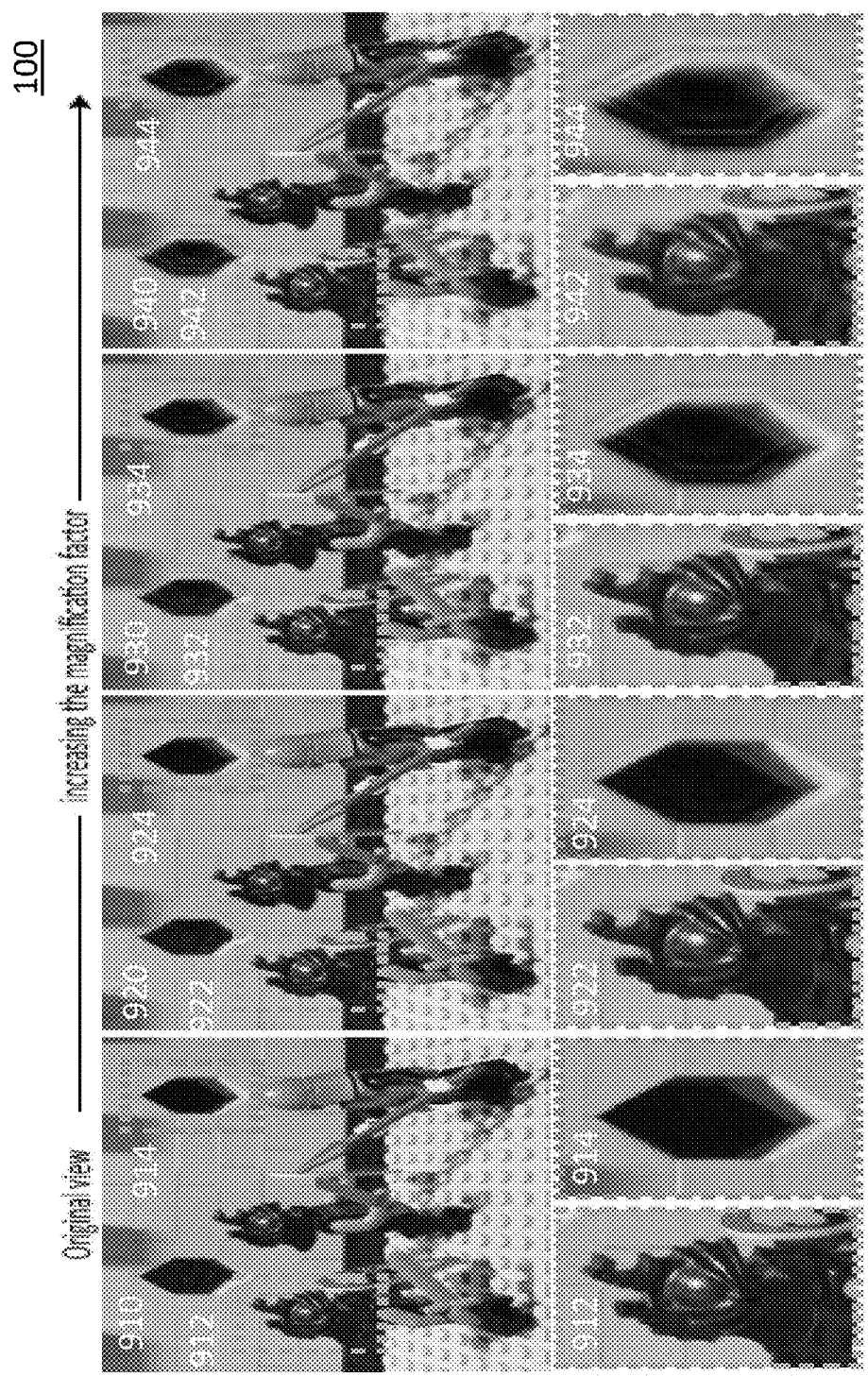
FIG. 9 is an example embodiment that shows how very large magnification factors (increasing from left to right) may affect the final quality of results. (See "The Stanford Light Field Archive," which is available from the Internet at lightfield.standford.edu, June 2008).

In one embodiment, the phase-based approach may process video that exhibits small displacements (Wadhwa, N., Rubinstein, M., Guttag, J., Durand, F., and Freeman, W. T., "Phase-Based Video Motion Processing," *ACM Trans. Graph.* (Proc. SIGGRAPH), 32, 4, July 2013, pg. 80:1-80:10, incorporated herein by reference). For larger displacements the locality assumption of the motion may not hold. Therefore, for larger displacements, lower spatial frequencies may be correctly reconstructed. In the context of view synthesis for multi-view autostereoscopic displays, this deficiency is largely alleviated due to the need of interperspective antialiasing. In an embodiment, in a case where the view synthesis may not correctly reconstruct high frequencies for scene elements with large disparity, these high frequencies are preferably removed anyway because they usually lie outside of the display bandwidth and may lead to aliasing artifacts. For cases where magnification factors and/or the interaxial between input images are large, some artifacts may remain visible. However, the method and system 100 of the present invention may reduce the number of cameras significantly. FIG. 9 visualizes a case where the magnification factor α values may be drastically increased.

In an embodiment 100, FIG. 9 shows how large magnification factors (increasing from left to right) may affect the final quality of results (see images 910, 912, 914, 920, 922, 924, 930, 932, 934, 940, 942, 944). For visualization purposes, the inter-view antialiasing is reduced to make the artifacts more visible. The input images come from "The Stanford Light Field Archive," which is available from the Internet at lightfield.standford.edu, June 2008.

The method and system 100 of the present invention is novel at least because it combines view synthesis and antialiasing for automultiscopic display, in contrast to existing approaches. In contrast to existing approaches, in at least one embodiment, the method and system 100 of the present invention described herein does not require explicit depth estimation and alleviates this source of artifacts. Instead, the method and system 100 of the present invention leverages the link between parallax and the local phase of Gabor-like wavelets, in practice complex-valued steerable pyramids. In one embodiment, this enables the method and system 100 of the present invention to exploit the translation-shift theorem and extrapolate the phase difference measured in the two input views. In one embodiment, the pyramid representation enables the method and system 100 of the present invention to integrate antialiasing directly and avoid expensive numerical prefiltering. The method and system 100 of the present invention derives a closed-form approximation to the prefiltering integral that results in a simple attenuation of coefficients based on the band and phase difference. The simplicity of the method and system 100 of the present invention is a key advantage because it enables an interactive implementation and provides robust performance even for difficult cases. The method and system 100 of the present invention also avoids artifacts at the focal plane, at least because the measured phase difference is zero. For displays that reproduce both horizontal and vertical parallax, the method and system 100 of the present invention may be extended to generate small light fields.

Figure 10:
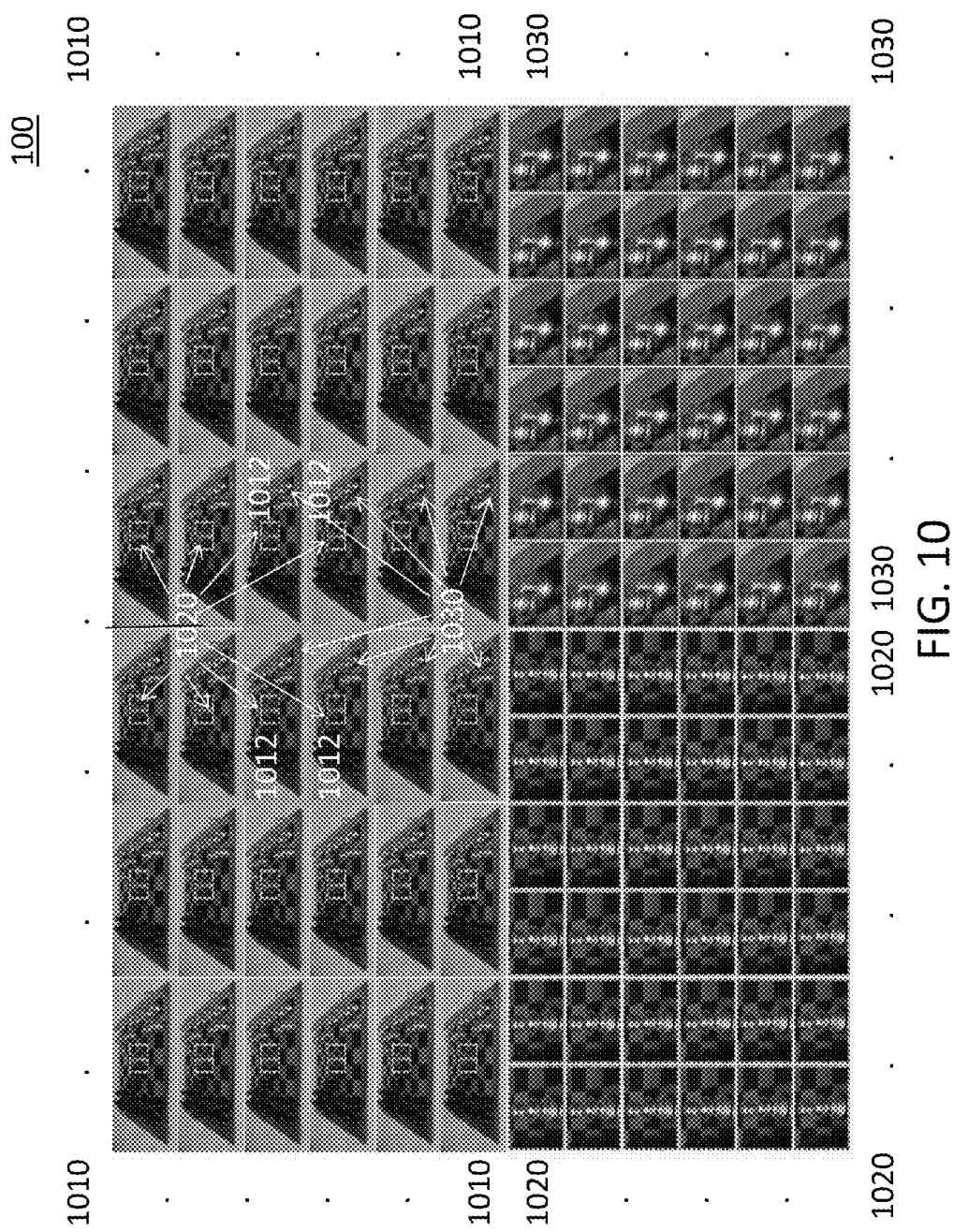
FIG. 10 is an example embodiment with four input images, in which the present invention creates views both in the horizontal direction and in the vertical direction. (See "The Stanford Light Field Archive," which is available from the Internet at lightfield.standford.edu, June 2008).

In an embodiment 100 shown in FIG. 10, additional views 1010 are created in the horizontal as well as the vertical direction, using (and surrounding) four input images 1012. In FIG. 10, the top image array of elements 1010 corresponds to a small light field created from the four images 1012 marked in green. The small insets shown below 1020, 1030 present magnified fragments of the reconstructed images from the image array elements 1010, 1012. In addition, please refer to the electronic color version of Applicants' paper mentioned above.

A further enhancement in embodiments involves prealigning the input views/images. Prealignment improves the quality of the output images. In the method and system 100 of the present invention, the disparities between the input images are preferably small. Therefore, the method and system 100 of the present invention may prealign the input images using simple transformations (e.g., shift, shear, etc.) to minimize the disparities, perform the view expansion using the method and system 100 steps described above, and then, may apply a transformation which cancels out the transformation applied to the input images. Such prealignment may be guided by a low quality disparity map estimated from input images.

In a non-limiting example embodiment, two images (left and right) are obtained with a disparities range of (50,60). The method and system 100 of the present invention may shift one of the images by 55 pixels, which may change the range of disparities to (−5,+5). The method and system 100 of the present invention may be applied to these shifted images, and compensate for the shift by shifting the output images accordingly. As mentioned above, the shift may be replaced by a simple operation that is easy to revert (e.g., shear), and it may be guided by a poor quality disparity map.

Figure 11:
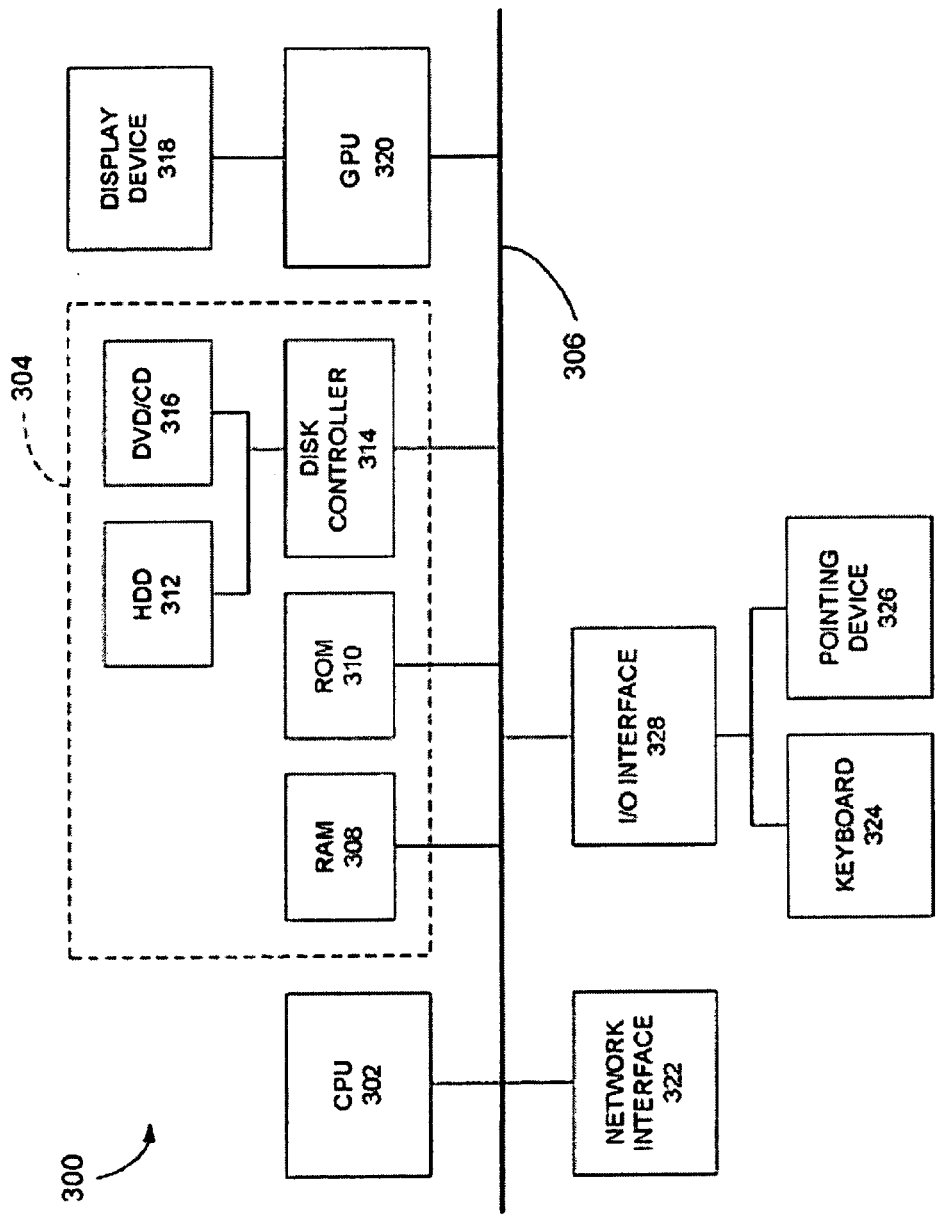
FIG. 11 is a block diagram of an embodiment of the present invention.

FIG. 11 is a high-level block diagram of an embodiment 300 of the present invention system and/or method 100 that generates a multi-view autostereoscopic display from a stereoscopic video input according to the principles of the present invention. The computer-based system 300 contains a bus 306. The bus 306 is a connection between the various components of the system 300. Connected to the bus 306 is an input/output device interface 328 for connecting various input and output devices, such as a keypad, controller unit, keyboard (generally 324), mouse/pointing device 326, display, speakers, touchscreen display (generally display device 318), etc. to the system 300. According to an embodiment of the invention, the input/output device interface 328 provides an interface for allowing a user to select video display parameters and aspects using any method as is known in the art.

A central processing unit (CPU) 302 is connected to the bus 306 and provides for the execution of computer instructions. Memory 310 provides volatile storage for data used for carrying out computer instructions. Storage or RAM 308 provides nonvolatile storage for software instructions such as an operating system. The system 300 also comprises a network interface 322, for connecting to any variety of networks, including wide area networks (WANs), local area networks (LANs), wireless networks, mobile device networks, cable data networks and so on.

In particular the steps of the processes described above and/or any additional processes that may be related to those described above may be stored as computer executable instructions in, for example a memory area 304 that is operably and/or communicatively coupled to the processor 302 and to a GPU 320 by a system bus 306 or similar supporting data communication line. A "memory area" as used herein, refers generally to any means of storing program code and instructions executable by one or more processors to aid in joint view expansion, filtering and disparity remapping for multi-view autostereoscopic display (i.e., automatically generating a multi-view and filtered 3D video stream from a 3D stereoscopic video stream). The memory area 304 may include one, or more than one, forms of memory. For example the memory area 304 may include random access memory (RAM) 308, which may include non-volatile RAM, magnetic RAM, ferroelectric RAM, and/or other forms of RAM. The memory area 304 may also include read-only memory (ROM) 310 and/or flash memory and/or electrically erasable programmable read-only memory (EEPROM). Any other suitable magnetic, optical and/or semiconductor memory, such as a hard disk drive (HDD) 312, by itself or in combination with other forms of memory, may be included in the memory area 304. HDD 312 may be coupled to a disk controller 314 for use in transmitting and receiving messages to and from processor 302. Moreover the memory area 304 may also be or may include a detachable or removable memory 316 such as a suitable cartridge disk, CD-ROM, DVD, or USB memory. The memory area 304 may in some embodiments effectively include cloud computing memory accessible through network interface 322, and the like. The above examples are exemplary only, and thus, are not intended to limit in any way the definition and/or meaning of the term "memory area."

In embodiments, a CPU 302 sends a stream of 3D stereo video images to GPU 320 via a system bus 306 or other communications coupling. GPU 320 employs the above-described methods, algorithms and computer-based techniques as programmed in memory area 304 to generate correctly filtered, multi-view video images for automultiscopic display on display device 318. The GPU 320 forms a picture of the screen image and stores it in a frame buffer. This picture is a large bitmap used to continually update and drive the screen image on display device 318.

The display device 318 may be, without limitation, a monitor, a television display, a plasma display, a liquid crystal display (LCD), a display based on light emitting diodes (LED), a display based on organic LEDs (OLEDs), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only, and thus, are not intended to limit in any way the definition and/or meaning of the term "display device".

While this invention has been particularly shown and described with references to example embodiments thereof, it will be understood by those skilled in the art that various changes in form and details may be made therein without departing from the scope of the invention encompassed by the appended claims.

For non-limiting example, depth-image-based rendering (DIBR) may be referred to as a depth image-based technique, a depth-based technique, depth-based rendering, and/or depth rendering, and may include depth estimation.

What is claimed is:

1. A method of rendering a three-dimensional (3D) video display, comprising the computer-implemented steps, by a processor and associated memory:
   receiving a video stream formed of a sequence of frames, each frame having image content corresponding to a plurality of views, the views being initial views;
   applying one or more spatial band pass filters to the received image content resulting in filtered images, each spatial band pass filter having a respective spatial frequency band;
   from the filtered images, computing one or more output images that synthesize additional views with respect to the initial views, the output images computed from the filtered images of a given spatial band pass filter corresponding to different visual disparities for the respective spatial frequency band of that given band pass filter;
   the computing of output images including removing interview aliasing by performing filtering of the output images: (i) according to local depth using phase shift including correcting the phase shift in each sub-band of the respective spatial frequency band separately based on the phase shift in a given corresponding sub-band having a lower frequency as compared with the respective spatial frequency band, and (ii) based upon performing a steerable pyramid decomposition and a corresponding attenuation of coefficients of the steerable pyramid decomposition; and
   driving a display with the computed and anti-aliased filtered output images, rendering a multi-view autostereoscopic 3D video display.

2. A method as claimed in claim 1 wherein the received video stream is a 3D stereo video stream of images having two views per frame.

3. A method as claimed in claim 1 wherein the step of applying one or more spatial band pass filters includes applying a one-dimensional (1D) filter.

4. A method as claimed in claim 1 wherein the step of applying spatial band pass filters includes applying a two-dimensional (2D) filter.

5. A method as claimed in claim 1, wherein the step of computing the output images results in a stereo disparity expansion of views, the output images include a disparity range, and the disparity range in the output images is user adjustable by any of: (i) adjusting a magnification factor in the given spatial band pass filter, and (ii) at least one of defining and translating a disparity mapping function to map a certain phase shift at the spatial frequency of the given spatial band pass filter to a new phase shift.

6. A method as claimed in claim 1 wherein the step of computing includes interpolating in-between views.

7. A method as claimed in claim 1 wherein the step of applying spatial band pass filters captures correspondence between views using phase differences for multiple spatial frequencies and orientations separately, and in the step of computing, local depth is represented as a plurality of values instead of as a single value.

8. A method as claimed in claim 1 wherein the step of driving the display is in real-time to the step of receiving the video stream.

9. A method as claimed in claim 1 further comprising prealigning the initial views with each other before applying the spatial band pass filters.

10. A method as claimed in claim 1 wherein the optional antialiasing is used for adding depth-of-field effect.

11. A method as claimed in claim 1 wherein the plurality of views includes two or more views.

12. A computer-implemented system for rendering a three-dimensional (3D) video display, comprising:
    at least one processor configured to implement:
    a receiving module configured to receive a video stream formed of a sequence of frames, each frame having image content corresponding to a plurality of views, the views being initial views;
    a computing module responsive to the receiving module and configured to apply one or more spatial band pass filters to the received image content resulting in filtered images, each spatial band pass filter having a respective spatial frequency band;
    the computing module further configured to compute, from the filtered images, one or more output images that synthesize additional views with respect to the initial views, the output images computed from the filtered images of a given spatial band pass filter corresponding to different visual disparities for the respective spatial frequency band of that given band pass filter;
    the computing module further configured to remove interview aliasing by performing filtering of the output images: (i) according to local depth using phase shift including correcting the phase shift in each sub-band of the respective spatial frequency band separately based on the phase shift in a given corresponding sub-band having a lower frequency as compared with the respective spatial frequency band, and (ii) based upon performing a steerable pyramid decomposition and a corresponding attenuation of coefficients of the steerable pyramid decomposition; and
    a display module coupled to receive from the computing module and configured to drive a display with the computed and anti-aliased filtered output images, rendering a multi-view autostereoscopic 3D video display.

13. A system as claimed in claim 12 wherein the system is a real-time 3D video conferencing system.

14. A system as claimed in claim 12 wherein the received video stream is a 3D stereo video stream of images having two views per frame.

15. A system as claimed in claim 12 wherein the computing module is further configured to apply at least one one-dimensional (1D) filter corresponding to at least one of the one or more spatial band pass filters.

16. A system as claimed in claim 12 wherein the computing module is further configured to apply at least one two-dimensional (2D) filter corresponding to at least one of the one or more spatial band pass filters.

17. A system as claimed in claim 12 wherein the computing module is further configured to compute the output images, resulting in a stereo disparity expansion of views, the output images further include a disparity range, and the display module is further configured to enable a user to adjust the disparity range in the output images by any of: (i) adjust a magnification factor in the given spatial band pass filter, and (ii) at least one of define and translate a disparity mapping function to map a certain phase shift at the spatial frequency of the given spatial band pass filter to a new phase shift.

18. A system as claimed in claim 12 wherein the computing module is further configured to interpolate in-between views.

19. A system as claimed in claim 12 wherein the computing module is further configured to apply spatial band pass filters including capturing correspondence between views using phase differences for multiple spatial frequencies and orientations separately, and the computing module is further configured to compute local depth including representing local depth as a plurality of values instead of as a single value.

20. A system as claimed in claim 12 wherein the display module is further configured to drive the display and the computing module is further configured to receive the video stream in real-time.

21. A system as claimed in claim 12 further comprising the computing module being configured to prealign the initial views with each other before the computing module is configured to apply the one or more spatial band pass filters.

22. A system as claimed in claim 12 wherein the optional antialiasing is used for adding depth-of-field effect.

23. A system as claimed in claim 12 wherein the plurality of views includes two or more views.

24. A non-transitory computer readable medium having stored thereon a sequence of instructions which, when loaded and executed by a processor coupled to an apparatus, causes the apparatus to:
  receive a video stream formed of a sequence of frames, each frame having image content corresponding to a plurality of views, the views being initial views;
  apply one or more spatial band pass filters to the received image content resulting in filtered images, each spatial band pass filter having a respective spatial frequency band;
  compute, from the filtered images, one or more output images that synthesize additional views with respect to the initial views, the output images computed from the filtered images of a given spatial band pass filter corresponding to different visual disparities for the respective spatial frequency band of that given band pass filter;
  including removing inter-view aliasing by performing filtering of the output images: (i) according to local depth using phase shift including correcting the phase shift in each sub-band of the respective spatial frequency band separately based on the phase shift in a given corresponding sub-band having a lower frequency as compared with the respective spatial frequency band, and (ii) based upon performing a steerable pyramid decomposition and a corresponding attenuation of coefficients of the steerable pyramid decomposition; and
  drive a display with the computed and anti-aliased filtered output images, rendering a multi-view autostereoscopic 3D video display.

* * * * *